US009395926B2

(12) United States Patent
Nakagawa et al.

(10) Patent No.: US 9,395,926 B2
(45) Date of Patent: Jul. 19, 2016

(54) STORAGE SYSTEM AND MANAGEMENT COMPUTER

(71) Applicant: HITACHI, LTD., Tokyo (JP)

(72) Inventors: Hirotaka Nakagawa, Tokyo (JP); Nobuhito Mori, Tokyo (JP)

(73) Assignee: HITACHI, LTD., Tokyo (JP)

( * ) Notice: Subject to any disclaimer, the term of this patent is extended or adjusted under 35 U.S.C. 154(b) by 25 days.

(21) Appl. No.: 14/426,937

(22) PCT Filed: Dec. 24, 2013

(86) PCT No.: PCT/JP2013/084435
§ 371 (c)(1),
(2) Date: Mar. 9, 2015

(87) PCT Pub. No.: WO2015/097738
PCT Pub. Date: Jul. 2, 2015

(65) Prior Publication Data
US 2016/0011805 A1    Jan. 14, 2016

(51) Int. Cl.
G06F 3/06    (2006.01)
(52) U.S. Cl.
CPC ............. *G06F 3/0619* (2013.01); *G06F 3/065* (2013.01); *G06F 3/0644* (2013.01); *G06F 3/0665* (2013.01); *G06F 3/0689* (2013.01)
(58) Field of Classification Search
None
See application file for complete search history.

(56) References Cited

U.S. PATENT DOCUMENTS

| 5,872,906 A * | 2/1999 | Morita ............... G06F 11/1088 714/6.12 |
| 7,254,684 B2 * | 8/2007 | Hiraiwa ............... G06F 3/0617 707/999.201 |
| 7,418,546 B2 * | 8/2008 | Taguchi ............... G06F 3/0605 707/999.009 |
| 7,475,189 B2 * | 1/2009 | Gabryjelski ......... G06F 11/1092 707/999.202 |

(Continued)

FOREIGN PATENT DOCUMENTS

JP    2006134021 A    5/2006
JP    2008040571 A    2/2008

(Continued)

OTHER PUBLICATIONS

Webopedia, "RAID—Redundant Array of Independent Disks", Jan. 2, 2013, pp. 1-3, https://web.archive.org/web/20130102204231/http://www.webopedia.com/TERM/R/RAID.html.*

*Primary Examiner* — Christopher D Birkhimer
(74) *Attorney, Agent, or Firm* — Volpe and Koenig, P.C.

(57) ABSTRACT

A storage system according to the present invention includes multiple real storage subsystems, and defines a virtual storage subsystem composed of resources included in one or multiple real storage subsystems. Upon defining a virtual storage subsystem, a virtual logical partition corresponding to a real storage subsystem is provided in the virtual storage subsystem, and a logical partition correlation information which is attribute (limitation) information showing whether various resource management operations extending over virtual logical partitions can be executed or not to each pair within the multiple virtual logical partitions is created and managed. When a management operation instruction regarding the virtual storage subsystem is received, if the resources being the operation target based on the management operation instruction belong to multiple virtual logical partitions, whether resource operation can be executed or not is determined based on the logical partition correlation information, and management operation is limited thereby.

10 Claims, 20 Drawing Sheets

(56) References Cited

U.S. PATENT DOCUMENTS

| | | | |
|---|---|---|---|
| 8,156,281 B1* | 4/2012 | Grosner | G06F 3/0607 711/114 |
| 2006/0101221 A1 | 5/2006 | Harada | |
| 2006/0288179 A1* | 12/2006 | Kihara | G06F 3/0607 711/162 |
| 2007/0033368 A1* | 2/2007 | Taguchi | G06F 3/0605 711/170 |
| 2008/0034005 A1 | 2/2008 | Satoyama et al. | |
| 2008/0126837 A1* | 5/2008 | Chen | G06F 11/2094 714/5.11 |
| 2009/0031320 A1 | 1/2009 | Nakagawa et al. | |
| 2011/0153930 A1 | 6/2011 | Serizawa et al. | |

FOREIGN PATENT DOCUMENTS

| | | |
|---|---|---|
| JP | 2009032014 A | 2/2009 |
| JP | 2012514777 A | 6/2012 |

\* cited by examiner

FIG. 3

RESOURCE ID MANAGEMENT TABLE (T2350)

| REAL RESOURCE ID | TYPE | RSG ID | LOGICAL RESOURCE ID |
|---|---|---|---|
| PORT#01 | PORT | 01 | PORT#01 |
| PORT#02 | PORT | 02 | PORT#02 |
| ... | PORT | ... | ... |
| PORT#FF | PORT | 3F | PORT#FF |
| VOL#0001 | VOLUME | 01 | VOL#0000 |
| VOL#0002 | VOLUME | 02 | VOL#0E01 |
| ... | VOLUME | ... | ... |
| VOL#FFFF | VOLUME | 3F | VOL#FFFF |
| PG#0000 | PARITY GROUP | 01 | PG#0000 |
| PG#0001 | PARITY GROUP | 02 | PG#0000 |
| PG#0010 | PARITY GROUP | 0# | PG#0000 |
| ... | PARITY GROUP | ... | ... |
| PG#FFFF | PARITY GROUP | 3F | PG#FFFF |

Columns: T2350A, T2350B, T2350C, T2350D

LOGICAL PARTITION MANAGEMENT TABLE (T2360)

| RSG ID |
|---|
| 00 |
| 01 |
|  |

FIG. 8

STORAGE SUBSYSTEM INTERCONNECT INFORMATION

T1100

| CONNECTION TYPE (T1110) | CONNECTION DESTINATION SUBSYSTEM ID (1120) |
|---|---|
| FC | VSP.222222 |
| PCI-E | VSP.333333 |

FIG. 9

REAL STORAGE SUBSYSTEM MANAGEMENT TABLE

T1000

| TYPE (T1010) | SERIAL NUMBER (T1020) | CONNECTION TYPE (T1030) | CONNECTION DESTINATION SUBSYSTEM ID (T1040) |
|---|---|---|---|
| VSP | 111111 | FC | VSP.222222 |
|  |  | PCI-E | VSP.333333 |
| VSP | 222222 | FC | VSP.111111 |
|  |  | FC | VSP.333333 |
| VSP | 333333 | PCI-E | VSP.111111 |
|  |  | FC | VSP.222222 |

VIRTUAL STORAGE MANAGEMENT TABLE T2000

| TYPE | S/N | PORT IP ADDRESS | NUMBER OF VOLUMES | NUMBER OF PORTS | NUMBER OF PARITY GROUPS | vRSG ID | | RSG ID |
|---|---|---|---|---|---|---|---|---|
| | | | | | | GLOBAL | LOCAL | |
| VSP | 1111 | 111.11.11.1 | 8192 | 128 | 16384 | 01 | RSG1 | VSP.111111.RSG01 |
| | | | | | | 02 | RSG2 | VSP.222222.RSG10 |
| | | | | | | 03 | RSG3 | VSP.333333.RSG03 |
| VSP | 1212 | 10.20.30.40 | 16384 | 256 | 8192 | 04 | RSG1 | VSP.111111.RSG02 |
| | | | | | | 05 | RSG2 | VSP.222222.RSG20 |
| USP | 55555 | 63.63.63.63 | 8192 | 95 | 8192 | 06 | RSG1 | VSP.333333.RSG04 |
| ... | ... | ... | ... | ... | ... | | | |

FIG. 11

| | | | | T2500 |
|---|---|---|---|
| VIRTUAL LOGICAL PARTITION RESOURCE MANAGEMENT TABLE | | | |
| vRSG ID (T2500A) | VIRTUAL RESOURCE ID (T2500B) | RSG ID (T2500C) | LOGICAL RESOURCE ID (T2500D) |
| RSG1 | VOL#0000 | VSP.111111.RSG01 | VOL#0000 |
| RSG1 | VOL#0001 | VSP.111111.RSG01 | VOL#0001 |
| RSG1 | VOL#0002 | VSP.111111.RSG01 | VOL#0002 |
| ... | ... | ... | ... |
| RSG1 | PORT#00 | VSP.111111.RSG01 | PORT#00 |
| RSG1 | PORT#01 | VSP.111111.RSG01 | PORT#01 |
| RSG1 | PORT#02 | VSP.111111.RSG01 | PORT#02 |
| RSG1 | ... | | |
| ... | ... | ... | ... |
| RSG1 | PG#0000 | VSP.111111.RSG01 | PG#0000 |
| RSG1 | PG#0001 | VSP.111111.RSG01 | PG#0001 |
| RSG1 | PG#0002 | VSP.111111.RSG01 | PG#0002 |
| ... | ... | ... | ... |
| RSG2 | VOL#0100 | VSP.222222.RSG10 | VOL#0000 |
| RSG2 | VOL#0101 | VSP.222222.RSG10 | VOL#0001 |
| ... | ... | ... | ... |

FIG. 12

LOGICAL PARTITION CORRELATION BITMAP

|  | ADD VOL | | LUNM | | DP | | LC | | RC | |
|---|---|---|---|---|---|---|---|---|---|---|
| VALUE | 1 | 0 | 1 | 0 | 1 | 1 | 1 | 0 | 0 | 0 |
| ADDRESS | 0 | 1 | 2 | 3 | 4 | 5 | 6 | 7 | 8 | 9 |

| ADDRESS | CONTENT OF AUTHORITY |
|---|---|
| 0 | CAPABLE OF CREATING VOLUME |
| 1 | CAPABLE OF CREATING LUSE VOLUME |
| 2 | CAPABLE OF CREATING NORMAL LUN |
| 3 | CAPABLE OF CREATING LUN WITH RESPONSE TIME DELAY EXTENDING OVER REAL STORAGE SUBSYSTEMS |
| 4 | CAPABLE OF CREATING DP POOL EXTENDING OVER LOGICAL PARTITIONS |
| 5 | CAPALE OF CREATING LOCAL COPY HAVING MULTIPLE GENERATIONS AMONG LOGICAL PARTITIONS |
| 6 | CAPABLE OF CREATING LOCAL COPY HAVING DIFFERENCE MANAGEMENT AMONG LOGICAL PARTITIONS |
| 7 | CAPABLE OF CREATING SYNCHRONOUS REMOTE COPY AMONG LOGICAL PARTITIONS |
| 8 | CAPABLE OF CREATING ASYNCHRONOUS REMOTE COPY AMONG LOGICAL PARTITIONS |
| 9 | CAPABLE OF CREATING ASYNCHRONOUS REMOTE COPY HAVING DIFFERENCE MANAGEMENT AMONG LOGICAL PARTITIONS |

FIG. 13

LOGICAL PARTITION CORRELATION MANAGEMENT TABLE

T3000

| VIRTUAL LOGICAL PARTITION GLOBAL ID (T3010) | COUNTERPART VIRTUAL LOGICAL PARTITION GLOBAL ID (T3020) | LOGICAL PARTITION CORRELATION BITMAP (T3030) |
|---|---|---|
| 1 | 2 | 00 01 0 00 000 |
| 1 | 3 | 11 10 1 11 000 |
| 1 | 4 | 00 00 0 00 111 |
| 1 | 5 | 00 00 0 00 111 |
| 1 | 6 | 00 00 0 00 111 |
| 2 | 3 | 00 00 0 00 000 |
| 2 | 4 | 00 00 0 00 111 |
| 2 | 5 | 00 00 0 00 111 |
| 2 | 6 | 00 00 0 00 111 |
| 3 | 4 | 00 00 0 00 111 |
| 3 | 5 | 00 00 0 00 111 |
| 3 | 6 | 00 00 0 00 111 |
| 4 | 5 | 00 00 0 00 000 |
| 4 | 6 | 00 00 0 00 111 |
| 5 | 6 | 00 00 0 00 111 |

FIG. 14

VIRTUAL STORAGE SUBSYSTEM CREATING SCREEN

■ VIRTUAL STORAGE SUBSYSTEM LIST

| STORAGE SUBSYSTEM ID |
|---|
| VSP.11111 |
| VSP.22222 |
| USP.55555 |
| |

◆ NUMBER OF VIRTUAL STORAGE SUBSYSTEMS : 3

■ SETTING OF VIRTUAL STORAGE SUBSYSTEM

MODEL : MODEL1 ▼      SERIAL  : 5555
(TYPE)                NUMBER
        MODEL1
        MODEL2

MANAGEMENT PORT : 192.168.3.12
IP ADDRESS

NUMBER OF PORTS : 32

NUMBER OF VOLUMES : 16384

NUMBER OF PARITY GROUPS : 8192

[ EXECUTE ]   [ CANCEL ]   [ BACK ]

FIG. 21

VIRTUAL LOGICAL PARTITION RESOURCE SETTING — D3500

■ VIRTUAL LOGICAL PARTITION LIST

D3510

| STORAGE SUBSYSTEM ID | vRSG ID |
|---|---|
| VSP.11111 | RSG1 |
| VSP.11111 | RSG2 |
| VSP.22222 | RSG1 |
| USP.55555 | RSG3 |
| | |

■ RESOURCE SETTING

D3520

RESOURCE TYPE: PORT ▼
- PORT
- PG
- VOL

D3530     D3540

RESOURCE: PORT#0000 ▼     V_ID: PORT#0000
- PORT#0000
- PORT#0001
- PORT#0002

D3550     D3570

[EXECUTE]     [BACK]

9,395,926 B2

STORAGE SYSTEM AND MANAGEMENT COMPUTER

TECHNICAL FIELD

The present invention relates to a storage system, and especially relates to facilitating management of operation of a system composed of multiple storage subsystems.

BACKGROUND ART

Along with the rapid increase of electronic information handled in other organizations, many storage subsystems are introduced and operated in the IT systems of organizations. One of the problems of introducing many storage subsystems in a computer system is that the management costs of administrators managing the computer system are increased. In order to facilitate management of multiple storage subsystems, a storage virtualization technique is used widely to enable multiple storage subsystems to be accessed as a single storage.

One example of virtualization is the virtualization of volumes. The storage subsystem constitutes one or multiple logical volumes from multiple physical devices, and provides the same to a host system such as a host computer using the storage subsystem. Furthermore, another form of virtualization exists where multiple logical volumes provided by the multiple storage subsystems are virtualized as one or multiple virtual volumes, provided to a host system.

According to another virtualization example, there is a proposal to virtualize the whole storage subsystem. For example, Patent Literature 1 discloses an art of providing multiple logical volumes of multiple real storage subsystems as logical volumes within a single virtual storage subsystem to a host computer and a management computer in a computer system where multiple real storage subsystems are mutually connected via a network.

CITATION LIST

Patent Literature

[PTL 1] Japanese Patent Application Laid-Open Publication No. 2008-040571

SUMMARY OF INVENTION

Technical Problem

According to the art taught in Patent Literature 1, a virtual identifier unique within multiple storage subsystems is assigned to each storage resource such as volumes included in each storage subsystem, and responds the virtual identifier to the host computer or the storage administrator to provide the storage resources of multiple storage subsystems as the storage resource of a single virtual storage subsystem. However, upon executing resource management of the virtual storage subsystem, the storage administrator managing the virtual storage subsystem must execute the management while comprehending the arrangement of components, the specification of the real storage subsystem and the form of connection between the components and the real storage subsystems, so that as a result, both the multiple real storage subsystems and the virtual storage subsystems composed of the real storage subsystems become the target of management. In other words, the storage subsystems being the target of management are increased. Thereby, the load (cost) of management is increased compared to an environment where virtual storage subsystems are not composed.

Solution to Problem

The present invention provides a computer system and a storage subsystem management method for limiting management operation of resources by considering the configuration of the real storage subsystems or the form of connection between real storage subsystems. The storage system according to one embodiment of the present invention has multiple real storage subsystems, and when constituting or defining virtual storage subsystems from one or multiple real storage subsystems, virtual logical partitions corresponding to the real storage subsystems are provided to the virtual storage subsystems. Further, an attribute (limitation) is set considering the forms of connections between real storage subsystems for all combinations (pairs) of the multiple virtual logical partitions. When a management operation instruction to the virtual storage subsystem is received, if the resource designated as the target of operation based on the management operation instruction belongs to multiple virtual logical partitions, the present system determines whether resource operation is limited or not based on the attribute set to the multiple virtual logical partitions, and limits the management operation.

Advantageous Effects of Invention

The present invention enables the storage administrator to manage only virtual storage subsystems as the operation target in a configuration including multiple storage subsystems, and to reduce management costs compared to the prior art management of multiple storages.

BRIEF DESCRIPTION OF DRAWINGS

FIG. 3 shows an example of a resource ID management table stored in the storage subsystem 2000.

FIG. 4 is an example of a logical partition management table stored in the storage subsystem 2000.

FIG. 8 shows an example of a storage subsystem interconnect information stored in the storage subsystem 2000.

FIG. 9 shows an example of a real storage subsystem management table stored in a management computer 4000.

FIG. 10 shows an example of a virtual storage subsystem management table stored in the management computer 4000.

FIG. 11 shows an example of a virtual logical partition resource management table included in the management computer 4000.

FIG. 12 shows an example of a bitmap indicating limitation information among logical partitions created by the virtualization management program included in the management computer 4000.

FIG. 13 shows an example of a logical partition correlation management table included in the management computer 4000.

FIG. 14 shows a configuration example of a virtual storage subsystem creation screen provided by the virtualization management program.

FIG. 21 is a configuration example of a resource registration screen to the virtual logical partition.

DESCRIPTION OF EMBODIMENTS

Now, the preferred embodiments of the present invention will be described with reference to the drawings.

Preferred Embodiments

Figure 1:
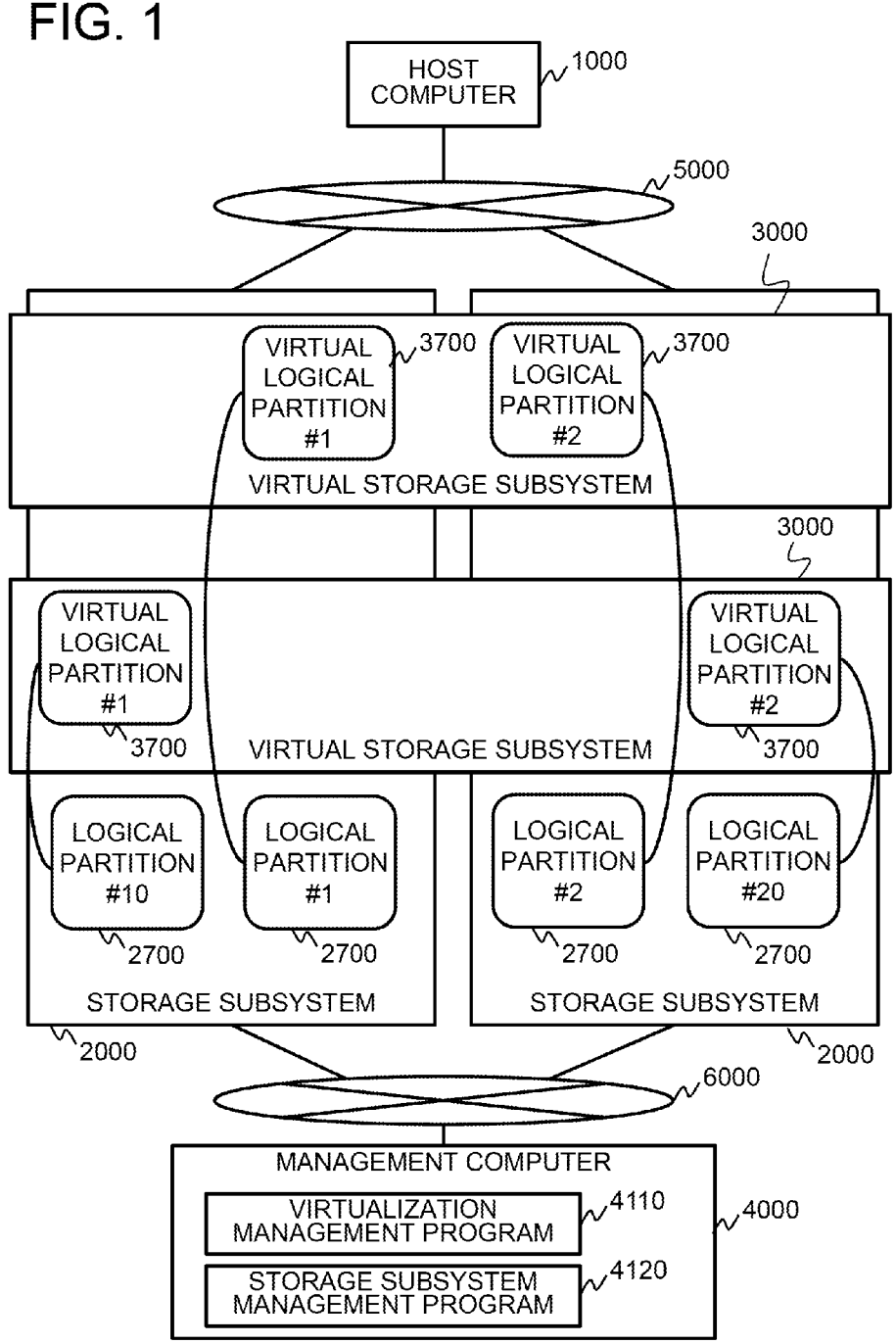
FIG. 1 illustrates an example of a basic configuration diagram according to an embodiment of the present invention.

FIG. 1 illustrates an example of a configuration diagram according to the present embodiment. A computer system according to the present embodiment is composed of multiple storage subsystems 2000*a* and 2000*b* (in the following description, the storage subsystems 2000*a* and 2000*b* are collectively referred to as "storage subsystem 2000"), a storage subsystem composed of a management computer 4000 connected to the multiple storage subsystems 2000, and a host computer 1000 accessing the storage subsystem 2000. The storage subsystem 2000 has a resource partitioning function for dividing a storage resource into multiple logical partitions (hereinafter referred to as logical partitions 2700). Further, the storage system has a virtual storage creating function, by which the system can assign virtual identifiers to storage resources such as ports and volumes (also referred to as logical devices), parity groups and logical partitions 2700, and notify the virtual identifiers to the host computer 1000 connected via a SAN (Storage Area Network) 5000 and the management computer 4000 connected via a management network 6000 such as a LAN. Further, the system is capable of receiving a management operation request designating the virtual identifier from an operator such as a storage administrator and the like. Further, a virtualization management program 4110 and a storage subsystem management program 4120 in the management computer 4000 can instruct change of configuration to a control structure of the storage subsystem 2000 including the resource partitioning function and the virtual storage creation function of the connected storage subsystem 2000. In FIG. 1, two logical partitions 2700 are set respectively to each of the storage subsystems 2000, wherein logical partitions #10 and #20 are mapped to a virtual logical partition 3700 of a single virtual storage subsystem 3000 (logical partition #10=virtual logical partition #1, logical partition #20=virtual logical partition #2), and logical partitions #1 and #2 are mapped to virtual logical partitions #1 and #2 of a different single virtual storage subsystem 3000. A storage administrator managing the virtual storage subsystem 3000 recognizes the virtual storage subsystem 3000 and the virtual logical partition 3700 via the storage subsystem management program 4120.

The virtualization management program 4110 performs management by creating a logical partition correlation information (bitmap), which is an attribute (limitation) information showing whether various resource management operations extending over logical partitions 2700 can be performed based on the connection relationship among the logical partitions 2700. For example, the logical partition correlation information includes information showing whether management operation (such as volume copy operation) using a resource belonging to virtual logical partition #1 and a resource belonging to virtual logical partition #2 can be executed or not. When the administrator uses a management screen of the management computer 4000 to output a management operation instruction for copying a volume of the virtual logical partition #1 to a volume of the virtual logical partition #2 using a local copy function of the storage subsystem, the storage subsystem management program 4120 refers to the logical partition correlation information, and determines whether volume copy using the local copy function from the resource of virtual logical partition #1 to the resource of virtual logical partition #2 is possible or not. When the logical partition correlation information indicates that local copy from the virtual logical partition #1 to the virtual logical partition #2 is not possible, a notice is sent to the administrator. This function enables the administrator to perform management operation by being conscious of only the virtual storage subsystem 3000 and not being conscious of the configuration or connection relationship of the storage subsystems 2000, and even when the management operation request is denied, the administrator can comprehend the reason for denial.

The following describes a method for setting virtual logical partitions and a method for setting a logical partition correlation information showing the operational limitations among virtual logical partitions via the virtualization management program 4110, and a method for restricting a management operation using the logical partition correlation information via the storage subsystem management program 4120. First, the configurations of the respective subsystems will be described.

Figure 2:
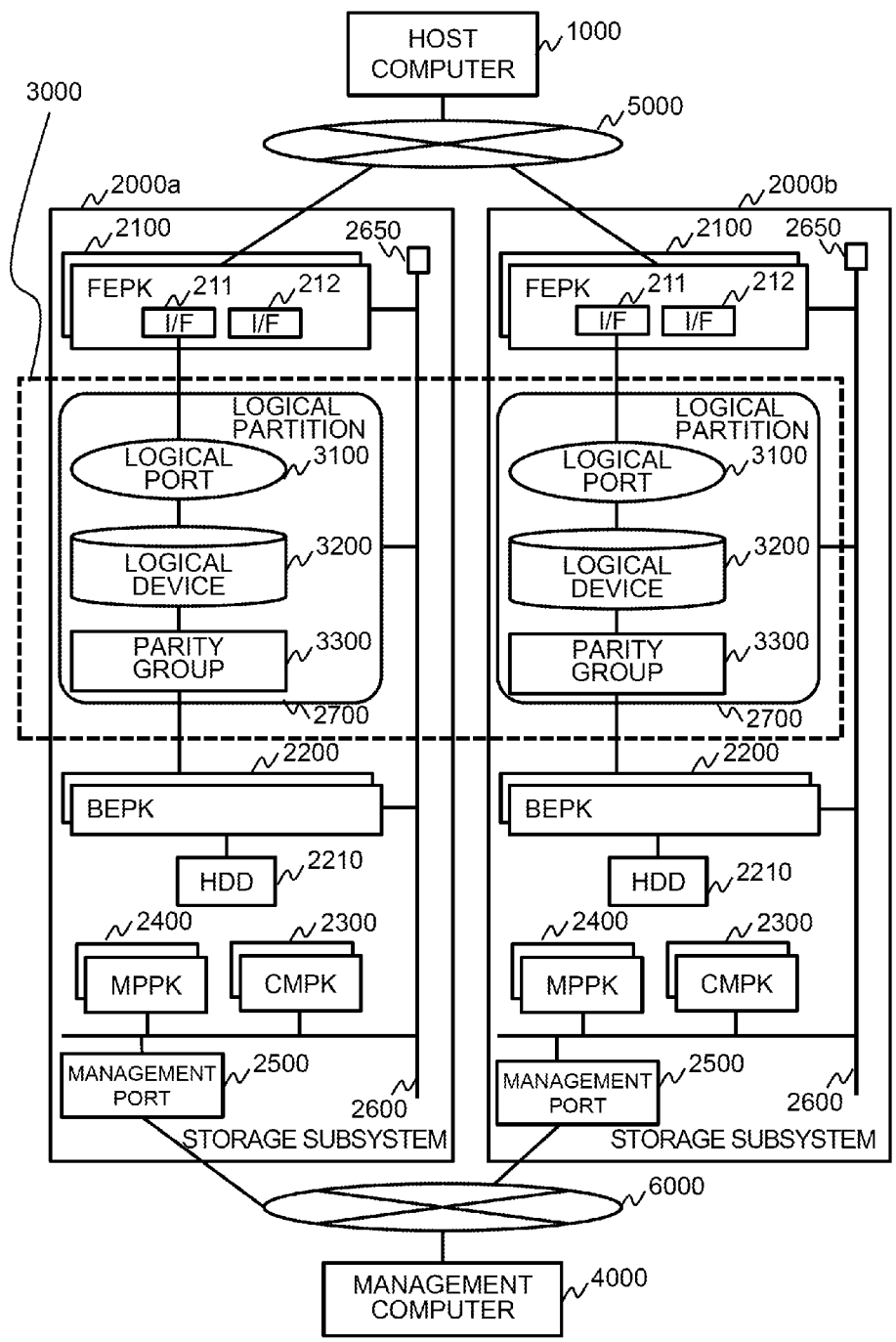
FIG. 2 shows a configuration example of a storage subsystem 2000.

The configuration of the storage subsystem 2000 will be described with reference to FIG. 2. As shown in FIG. 2, the storage subsystem 2000 is composed of host adapter units 2100 (also referred to as FrontEnd PacKage [FEPK], hereafter abbreviated as FEPK 2100), control units 2400 (also referred to as Micro Processor PacKage [MPPK], hereinafter abbreviated as MPPK 2400), shared memory units 2300 (also referred to as Cache Memory PacKage [CMPK], hereinafter abbreviated as CMPK 2300), disk adapter units 2200 (also referred to as BackEnd PacKage [BEPK], hereinafter abbreviated as BEPK 2200), HDDs (Hard Disk Drives) 2210 as an example of a storage device, a management port 2500, an internal network 2600, and an internal network I/F 2650. The internal network 2600 is composed of a high speed transmission medium such as a PCI Express, and mutually connects the FEPK 2100, the MPPK 2400, the CMPK 2300, the BPK 2400 and the management port 2500.

The respective MPs of the MPPK 2400 can communicate with any of the FEPK 2100, the CMPK 2300 and the BEPK 2200 via the internal network 2600. The FEPK 2100 comprises multiple host I/Fs for connecting to the SAN 5000 (corresponding to I/F 211 and I/F 212 of FIG. 2, hereinafter also referred to as "physical port". In the drawing, only two host I/Fs are provided to each FEPK 2100, but it is possible to provide more than two host I/Fs. The present invention can also be applied to a configuration where only one host I/F is provided). The host I/F (I/F 211 or 212) is a Fibre Channel interface if the transmission medium constituting the SAN 5000 is a Fibre Channel (hereinafter sometimes abbreviated as "FC"), and it is an Ethernet interface if the transmission medium constituting the SAN 5000 is an Ethernet (registered trademark). The host I/F (I/F 211 or 212) has an identifier (this identifier is referred to as a "physical identifier" or a "physical port ID") recognized by the host computer 1000 and the like (such as a WWN (World Wide Name) or a port ID when the host I/F is a Fibre Channel interface), and can have one or multiple logical/virtual identifiers via a so-called NPIV (N Port ID Virtualization) technique and the like. By having multiple virtual identifiers assigned to the physical port (I/F 211 or I/F 212), the host computer 1000 can recognize a single physical port as apparently (logically) multiple ports. This logical/virtual identifier is called a "logical port ID", and the apparent port recognized by the host computer 1000 is called a "logical port".

The BEPK 2200 has multiple disk I/Fs (not shown), wherein the multiple disk I/Fs are connected for example via a cable to the HDDs 2210, and also connected to the internal network 2600, for mediating a process of handing over read/write target data between the CMPK 2300 and the HDDs 2210.

The CMPK 2300 has a memory for data cache and a memory for control information. A volatile memory such as a DRAM (Dynamic Random Access Memory) is used as the memory for data cache and a memory for control information, but a nonvolatile memory such as a flash memory can also be used. If a volatile memory is used as the CMPK 2300, it is possible to provide a battery to the configuration so as not to have the data in the CMPK 2300 deleted when power supply to the storage subsystem 2000 is discontinued due to power failure or the like. The memory for data cache temporarily stores (caches) the data to be written to the HDD 2210, or temporarily stores (caches) the data read from the HDD 2210. The memory for control information stores information necessary for the processes that the storage subsystem 2000 performs, such as information handled by the resource partitioning function and the storage virtualization function, and the virtualization management program 4110 and the storage subsystem management program 4120 in the management computer 4000 can acquire the information in the memory for control via the management port 2500.

The MPPK 2400 has multiple MPs (Micro Processors), a local memory (LM) and a bus connecting the same. Each MP executes a control program to perform processes that the storage subsystem 2000 should perform, such as processing I/O requests (read request, write request or the like) from the host computer 1000, and processing management operation requests from the management computer 4000. The LM stores a portion of the control information stored in the memory for control information.

The management port 2500 is a port for transmitting an operation request from the management computer 4000 to a control program loaded from the memory for control information to the LM of the MPPK 2400 and executed by the MP.

Next, we will describe the major functions of the storage subsystem 2000 and the technical terms related to the functions. However, all functions are provided in well-known storage subsystems, so that actual descriptions related to the functions will be omitted.

(1) Volume Creation

The storage subsystem 2000 manages a set of multiple HDDs 2210 as a single group, and this group is called a "parity group". The storage subsystem 2000 according to the present embodiment uses a so-called RAID (Redundant Arrays of Inexpensive Disks, or Redundant Arrays of Independent Disks) technique to make the data redundant to prepare for disk failure, wherein the data and redundant data are dispersed and stored in multiple disks. The parity group is a set of disks being the target of data storage when storing the data and the redundant data in a dispersed manner using the RAID technique (however, the present invention is also applicable to a case of creating an assembly of [so-called RAID0] disks that does not generate redundant data). The storage subsystem 2000 divides this parity group into one or multiple continuous areas, and the divided areas are each defined and managed as volumes (logical devices). As described, the storage subsystem 2000 has a function to define a portion of the area within the parity group as a logical device, and this function is called volume creating function.

(2) Expanded Volume Creation

Further, the storage subsystem 2000 has a function to concatenate multiple volumes and define the concatenated multiple volumes as a single expanded volume. This expanded volume (formed by concatenate multiple volumes) is called "expanded volume" and the function for defining (creating) an expanded volume is called an "expanded volume creating function" (the expanded volume is sometimes abbreviated as LUSE).

(3) Logical Path Creation

A function for allowing the host computer 1000 to access (such as read or write) the above-described volume (including the expanded volume) is called "logical path creating function". In general, a major process performed by the logical path creating function provides information of a port (such as a host I/F 211) to which the volume is (logically) connected, and assigns a LUN (abbreviation of Logical Unit Number) to the volume, and provides a volume of the storage subsystem to the host computer 1000 (so that the host computer 1000 can recognize and access the volume of the storage subsystem).

(4) Pool Creation

In addition to defining logical devices and expanded volumes and providing the same to the host computer 1000, the storage subsystem 2000 has a function to provide a virtual volume formed using a so-called thin-provisioning technique (hereinafter, the virtual volume formed using thin-provisioning technique is called "virtual volume") to the host computer 1000. A thin-provisioning technique is a well-known technique so that detailed description thereof is omitted, but according to the thin-provisioning technique, when a write request designating an address within the virtual volume is provided from the host computer 1000, a storage area is allocated dynamically to the position designated by the address of the virtual volume. The storage subsystem 2000 creates and manages a regional assembly called a capacity virtualization pool (called dynamic provisioning pool, or DP pool) for managing the storage area to be allocated to the virtual volume. One or more logical devices are registered to the capacity virtualization pool, wherein when allocating a storage area to the virtual volume, an unused area within the logical device in the capacity virtualization pool is used. The function for creating such capacity virtualization pool is called "pool creating function".

(5) Volume Copy Function

The storage subsystem 2000 has functions to replicate data in a volume (including an expanded volume and a virtual volume other than the logical device described above) to a different volume, and this function is called volume copy function. The volume copy function includes a copy function where the volume within the same storage subsystem 2000 as the storage subsystem 2000 to which the copy source volume belongs is set as the copy destination, and a copy function where the volume within a storage subsystem 2000 different from the storage subsystem 2000 to which the copy source volume belongs is set as the copy destination (for example, the data within the volume of the storage subsystem 2000a is copied to the volume of the storage subsystem 2000b), which are respectively called "local copy function" and "remote copy function".

(5-1) Local Copy Function

In the local copy function of the storage subsystem 2000 according to the present embodiment, the multiple volumes within the storage subsystem 2000 is set as a copy destination volume and replication is performed, so that volume backup of multiple generations can be created. Further, it has a differential management function in which when copy processing is interrupted, the update information from the host computer 1000 to the volume output during the interruption is managed as a differential data, and when the copy processing is resumed, only the differential data is replicated. These functions are well-known, as taught in Japanese Patent Application Laid-Open Publication No. 2005-190259 (United States Patent Application Publication No. 2005/0149577) and U.S. Pat. No. 6,101,497, so that detailed description thereof will be omitted.

(5-2) Remote Copy Function

There are three types of remote copy functions that the storage subsystem 2000 of the present embodiment has, which are a synchronous remote copy function, an asynchronous remote copy function, and a journal storage type remote copy. These functions are well-known functions, as taught for example in U.S. Pat. No. 5,742,792 and Japanese Patent Application Laid-Open Publication No. 2005-18506 (U.S. Pat. No. 7,152,079), so that detailed descriptions thereof are omitted. One major difference between the remote copy function and the local copy function of the storage subsystem 2000 according to the present embodiment is that the remote copy function does not have a function to create volume copy of multiple generations.

These are the major functions that the storage subsystem 2000 according to the present embodiment has. In addition to the above functions, the storage subsystem 2000 has a function to divide resources such as logical devices into one or multiple sections and manage the same. This function is called resource partitioning function, and the section defined by the resource partitioning function is called a "logical partition" (logical partition 2700 of FIG. 2). The logical partition is also referred to as "RSG" (abbreviation of ReSource Group). In the present specification, a "resource" means an object, such as a logical device, being the target of storage management operation. Examples of resource that can be divided and managed by the resource partitioning function according to the present specification include, in addition to the aforementioned logical device, a parity group 3300 and a logical port 3100. The storage subsystem 2000 stores a list information (resource ID management table T2350) belonging to each logical partition 2700 in the memory for control information, and performs maintenance management of the logical partitions 2700.

FIG. 3 is a view showing a configuration example of a resource ID management table T2350 managed by the storage subsystem 2000. The resource ID management table T2350 is a table for managing an identifier (ID) of a resource belonging to each logical partition within the storage subsystem 2000, which exists for each storage subsystem 2000. The resource ID management table T2350 includes a real resource ID entry T2350A, a type entry T2350B, an RSG ID entry T2350C, and a logical resource ID entry T2350D.

The real resource ID entry T2350A stores an identifier (real resource identifier) allocated to each resource within the storage subsystem 2000. The real resource identifier is an identifier capable of specifying a unique resource within the storage subsystem 2000.

The type entry T2350B shows the type of each resource. According to the present embodiment, the registered types are a port, a volume and a parity group. It is possible to register types other than those types.

According to the storage subsystem 2000 of the present embodiment, a unique identifier within the storage subsystem 2000 is assigned to each logical partition (RSG) defined in the storage subsystem 2000 for management, and this identifier is called an RSG ID. The RSG ID entry T2350C stores the identifier of the RSG to which each resource (resource specified by the real resource ID entry T2350A) belongs. In the present embodiment, all the registered resources belong to one of the RSGs.

The logical resource ID entry T2350D stores a logical resource identifier assigned to the resource. A logical resource identifier is an identifier in a name space within the RSG, which is an identifier capable of uniquely specifying a resource within the RSG, but a unique ID within the storage subsystem 2000 can also be used.

In each RSG, a name space is defined in each RSG to assign a logical resource identifier to the respective resource. Therefore, in each RSG, it is possible to assign a logical resource ID to each resource independently from the logical resource ID of other RSGs and a real resource ID assigned in the real storage subsystem 2000. Thereby, it is possible to assign a logical resource ID freely in each RSG and to facilitate management of resources. As mentioned earlier, the RSG ID is unique within the storage subsystem 2000, and the identifier composed of a set of RSG ID and logical resource ID can specify a resource uniquely within the storage subsystem 2000, similar to the real resource identifier.

Further, each storage subsystem 2000 retains a table (logical partition management table) storing a list of IDs (RSG IDs) of logical partitions managed by its own storage subsystem 2000. FIG. 4 is a view illustrating a configuration example of a logical partition management table T2360. The logical partition management table T2360 is a table created and managed by each storage subsystem 2000, and stores an ID (RSG ID) of a logical partition managed by the storage subsystem 2000. When the storage subsystem 2000 newly creates a logical partition based on the instruction from the management computer 4000 or the like, an unused RSG ID (not yet registered in the logical partition management table T2360) is specified based on the contents of this table, and an unused RSG ID is allocated to the new RSG. Upon creating a new RSG, it is not possible to allocate an RSG ID already registered in the logical partition management table T2360 to the logical partition.

Figure 5:
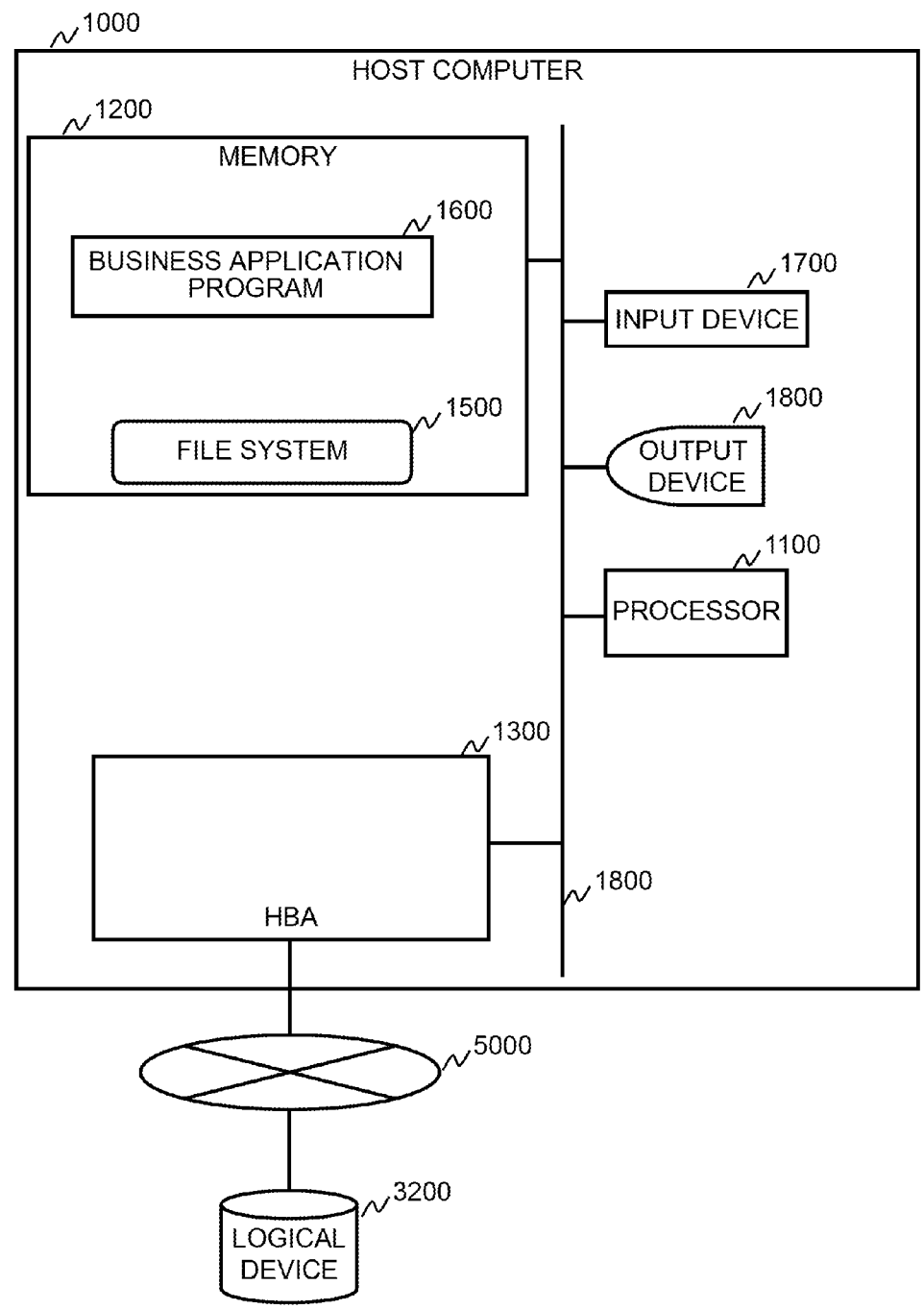
FIG. 5 shows a configuration example of a host computer 1000.

The configuration of the host computer 1000 will be described with reference to FIG. 5. The host computer 1000 is a computer device equipped with a processor 1100, a memory 1200, a file system 1500, an alternate path execution unit 1400, a host bus adapter (HBA) 1300, an input device 1700, and an output device 1800, and it can be a personal computer, a work station or a mainframe.

The processor 1100 performs various control processes by executing a business application program 1600 and the like stored in the memory 1200. For example, the processor 1100 issues a read access request or a write access request to the logical device 3200 provided by the storage subsystem 2000 by executing the business application program 1600 and the file system 1500.

The memory 1200 is used for storing programs and the like, and also used as a work area used when the processor 1100 executes various programs.

The host bus adapter (HBA) 1300 performs protocol control during communication with the storage subsystem 2000. By the host bus adapter 1300 executing a protocol control function, transmission and reception of data and commands according to a Fibre Channel protocol, for example, is performed between the host computer 1000 and the storage subsystem 2000.

The input device 1700 is composed of a keyboard, a switch, a pointing device and a microphone, for example. The output device 1600 is composed of a monitor display and a speaker, for example.

Figure 6:
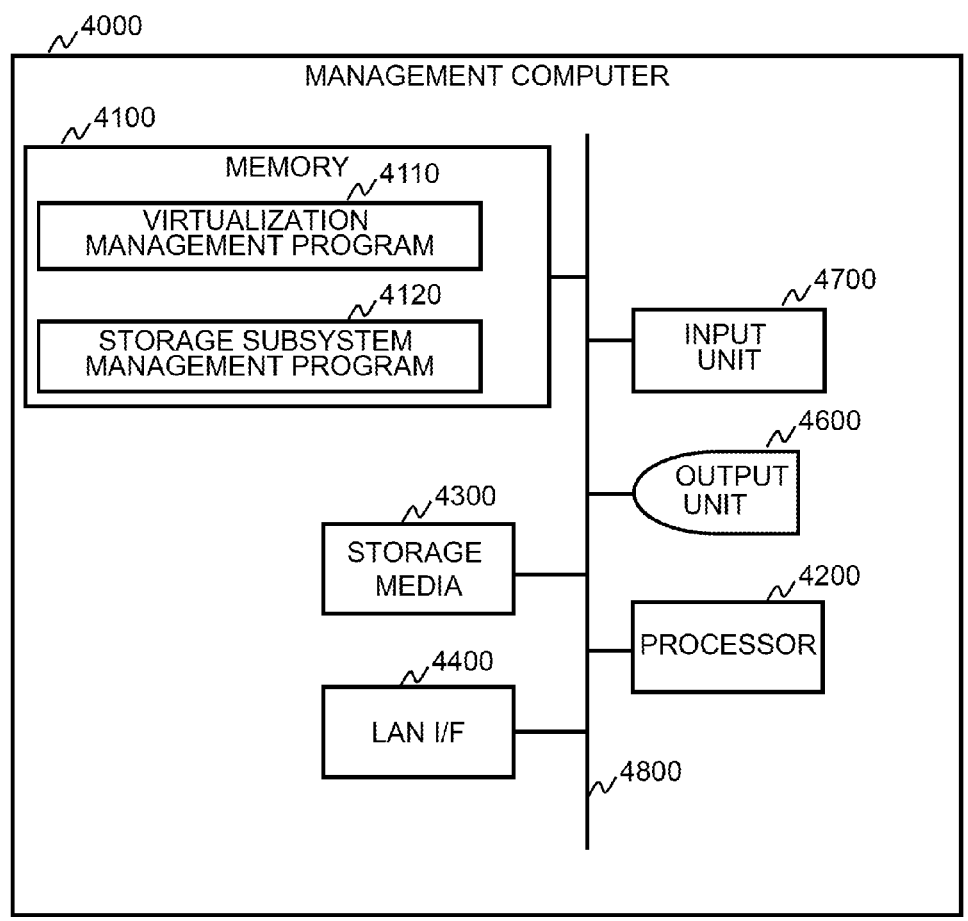
FIG. 6 shows a configuration example of a management computer 4000.

FIG. 6 illustrates a configuration of the management computer 4000. The management computer 4000 includes a processor 4200, a memory 4100, a storage media 4300, a LAN I/F 4400, an input unit 4700, and an output unit 4600. By having the processor 4200 execute the virtualization management program 4110 or the storage subsystem management program 4120 loaded to the memory 4100, the management computer 4000 transmits various storage configuration management operation requests via the LAN I/F 4400 to the storage subsystem 2000. Further, the memory 4100 stores the control information used by the virtualization management program 4110 and the storage subsystem management program 4120. The storage administrator can refer to configurations of each storage subsystem 2000 via a management screen (GUI) displayed on the output unit 4600 such as a display, and can enter operation requests using the input device 4700 such as a keyboard or a mouse to perform operations such as referring to a configuration or creating a volume. The storage media 4300 is for storing execution logs of various control programs such as the virtualization management program 4110 and the storage subsystem management program 4120. HDDs and SSDs can be used, for example, as the storage media 4300.

Figure 7:
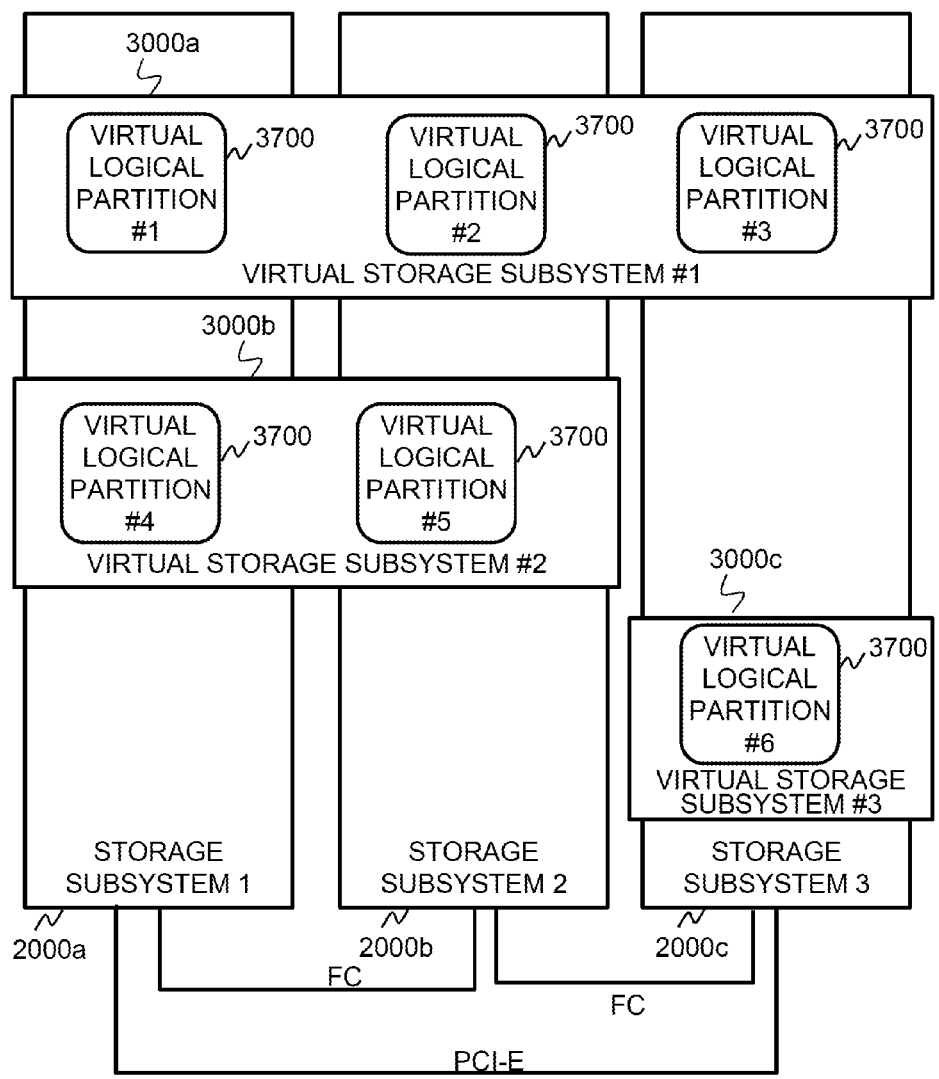
FIG. 7 shows a configuration diagram of a virtual storage subsystem 3000 and a virtual logical partition 3700 according to the preferred embodiment of the invention.

FIG. 7 is a view illustrating a relationship of the virtual storage subsystem 3000, the virtual logical partition 3700 and the storage subsystem 2000. According to the present configuration, there are three storage subsystems 2000 (storage subsystems 2000a, 2000b and 2000c), and one or more of these subsystems can be used to define virtual storage subsystems (3000a, 3000b and 3000c) (hereafter, the virtual storage subsystems 3000a, 3000b and 3000c are collectively referred to as "virtual storage subsystem 3000"). The virtual storage subsystem 3000 has one or more virtual logical partitions, and each virtual logical partition has a one-to-one correspondence with the logical partition of the storage subsystem 2000, as shown in FIG. 1.

For example, a virtual storage subsystem #1 (3000a) has virtual logical partitions #1, #2 and #3 mapped to logical partitions 2700 of the respective storage subsystems 2000a, 2000b and 2000c, a virtual storage subsystem #2 (3000b) has virtual logical partitions #4 and #5 mapped to the logical partitions 2700 of the storage subsystems 2000a and 2000b, and a virtual storage subsystem #3 has a virtual logical partition #6 mapped to the logical partition 2700 of the storage subsystem 2000c.

As described later, the virtual logical partition only has a resource belonging to the logical partition of the storage subsystem 2000, so that the virtual logical partition and the logical partition are practically equivalent. Therefore, it can be stated that the virtual storage subsystem 3000 is composed of one or more virtual logical partitions, and it can also be stated that it is composed of one or more logical partitions (of the storage subsystem 2000). Further, each virtual storage subsystem 3000 is defined to have identification information such as the model and serial number of the system, and port (and IP address) for communicating with the management computer 4000 and the like, so that it is recognized as a single storage subsystem from the management computer 4000 and the like.

As described earlier, the virtual storage subsystem 3000 is composed of multiple logical partitions (or virtual logical partitions), and each logical partition has a resource of the storage subsystem 2000 belonging to the logical partition, so that the virtual storage subsystem 3000 is recognized as a single virtual subsystem having resources of respective logical partitions from the management computer 4000 and the host computer. The term "recognized" means that from the management point of view, it seems as if a single (or multiple) virtual storage system exists independently from the physical storage subsystem (2000), and as a result, management operation can be performed to the virtual storage subsystem from the management computer 4000 and the like. For example, the management function (management software) generally provided in the management computer 4000 can refer to the configuration information of each storage subsystem 2000 being managed (connected to the management computer 4000 via the management network 6000), and when the virtual storage subsystem 3000 is defined, the management computer 4000 can refer to the configuration information of the virtual storage subsystem 3000 or output management operation requests such as volume copying operation.

When defining and configuring the virtual storage subsystem 3000 from multiple storage subsystems 2000, the respective storage subsystems 2000 constituting the virtual storage subsystem 3000 must be connected mutually via a transmission line (transmission media). In the case of the configuration example illustrated in FIG. 7, the storage subsystem 1 (2000a) and the storage subsystem 2 (2000b) or the storage subsystem 2 (2000b) and the storage subsystem 3 (2000c) can have one of mutual host I/Fs (211 or 212) connected via an FC (Fibre Channel) cable. Further, the storage subsystem 1 (2000a) and the storage subsystem 3 (2000c) adopts a configuration where the internal networks 2600 are connected each other via a transmission line through the internal network I/F 2650 (or it is possible to provide a transmission line independent from the internal network 2600 realized via a PCI Express or the like capable of communicating at a higher speed than the FC for mutually connecting the respective components including the MPPK 2400 and the CMPK 2300 within the storage subsystems 2000a and 2000c, and the components within the storage subsystems 2000a and 2000c are mutually connected via the transmission line). In the embodiment of the present invention, a form of connection where the storage subsystems 2000 are mutually connected via a FC is called loose coupling. Further, a form of connection where the storage subsystems 2000 are mutually connected via an internal network 2600 or a transmission line independently disposed to mutually connect the components of the storage subsystems 2000a and 2000c is called tight coupling. When the transmission media constituting the SAN 5000 of FIG. 2 utilizes an FC, the FC connecting the storage subsystem 1 and the storage subsystem 2 can be formed as a portion of the SAN 5000, or can utilize a transmission media that differs from the SAN 5000.

According to the storage subsystem 2000 of the present embodiment, when multiple storage subsystems 2000 are either tightly coupled or loosely coupled, processing can be performed using resources of other storage subsystems 2000 coupled thereto. For example, when the storage subsystems 2000a and 2000b are loosely coupled or tightly coupled, an I/O request to the volume (logical device 3200 of FIG. 2) of the storage subsystem 2000b can be received via the port (host I/F 211, 212) of the storage subsystem 2000a.

In the case of loose coupling, there are some limitations in the processes that the storage subsystem 2000 can execute. For example, when the storage subsystems 2000a and 2000b are tightly coupled, the (MP of the) storage subsystem 2000a can handle the volume within the storage subsystem 2000b as if it is an internal volume belonging thereto (disposed within the storage subsystem 2000a). Normally, a local copy function is only capable of copying volumes within a single storage subsystem, but when the storage subsystems 2000a and 2000b are tightly coupled, the volume included in the storage subsystem 2000a can be used as a copy source volume, and the volume included in the storage subsystem 2000b can be used as a copy destination volume (or opposite) when performing a copying process.

On the other hand, in the case of loose coupling, (the MP of) the storage subsystem 2000a cannot handle the volume within the storage subsystem 2000b as the volume included in its own subsystem (storage subsystem 2000a). Therefore, the data within the volume of the storage subsystem 2000a cannot be replicated in the volume of the storage subsystem 2000b (or opposite) using the local copy function.

FIG. 8 illustrates one example of a storage subsystem interconnect information T1100 stored in each storage subsystem 2000. Entry T1110 stores the type of the transmission media (FC or PCI-E) interconnecting the storage subsystems 2000, and entry T1120 stores the identifier (ID) of the storage subsystem 2000 connected thereto. Entry T1120 stores the information of the storage subsystem 2000 according to the present embodiment, where the ID of the storage subsystem 2000 is shown via a format where the model of the subsystem (such as the VSP) and the serial number (S/N) of the subsystem are connected via a period ".". FIG. 8 shows that the storage subsystem 2000 having the storage subsystem interconnect information T1100 adopts a connection configuration where a connection destination subsystem ID (T1120) is connected via an FC with the subsystem of "VSP.222222" (subsystem whose model is "VSP" and serial number is "222222"), and where a connection destination subsystem ID (T1120) is connected via a PCI-E with the subsystem of "VSP.333333" (subsystem whose model is "VSP" and serial number is "333333"). This information is stored in the storage subsystem interconnect information T1100 by the administrator of the storage subsystem 20000 entering the information of the connection destination subsystem ID (T1120) and the connection type T1110 from the management computer 4000 or a maintenance terminal (not shown) of the storage subsystem 2000, after the storage subsystems 20000 are connected via a FC or a PCI-E. Since the storage subsystem interconnect information T1100 is information respectively managed by each storage subsystem 2000, the administrator of the storage subsystem 2000 executes an operation to enter the information of the connection destination subsystem ID (T1120) and the connection type T1110 for each storage subsystem 2000.

FIG. 9 is a configuration example of a real storage subsystem management table T1000 referred to by the virtualization management program 4110. The real storage subsystem management table T1000 collects the storage subsystem interconnect information T1100 of all the storage subsystems 2000 managed by the management computer 4000 (connected to the management computer 4000 via the management network 6000). Each row (entry) of the storage subsystem interconnect information T1100 has an entry for storing information regarding the model (T1010), the serial number (T1020), the connection type (T1030) and the connection destination subsystem ID (T1040), and shows that the storage subsystem 2000 having the subsystem ID stored in the entry of the connection destination subsystem ID (T1040) is connected to the storage subsystem 2000 specified by the model (T1010) and the serial number (T1020). The connection type (FC or PCI-E) is stored in the connection type entry (T1030). Further, a configuration is possible where multiple storage subsystems 2000 are connected to a single storage subsystem 2000, so that there are multiple entries storing information on the connection type (T1030) and the connection destination subsystem ID (T1040) in a single entry (one example of which is row T1050 of FIG. 9).

When an instruction to detect a storage subsystem 2000 is received from the storage administrator, the virtualization management program 4110 transmits a storage subsystem interconnect information notice request via the management network 6000 to the respective storage subsystems 2000, and acquires a storage subsystem interconnect information T1100 from the respective storage subsystems 2000. The virtualization management program 4110 having received the storage subsystem interconnect information T1100 from the storage subsystem 2000 creates a new entry (row) in the real storage subsystem management table T1000, and registers the model and the serial number of the storage subsystem 2000 of the transmission source of the acquired storage subsystem interconnect information T1100 to the entries T1010 and T1020. Then, the information of the connection type (T1110) stored in the acquired storage subsystem interconnect information T1110 and the storage subsystem identifier (T1120) information are registered in the entries T1030 and T1040.

FIG. 10 is a configuration example of the virtual storage subsystem management table T2000 managed by the virtualization management program 4110. The virtualization management program 4110 registers the information of the virtual storage subsystem 3000 managed by the management computer 4000 and the configuration information of the virtual logical partition 3700 within the virtual storage subsystem 3000. The virtual storage subsystem 3000 can be defined based on this information. Further, the respective storage subsystems 2000 also retain similar information as the virtual storage subsystem management table T2000.

Each row (entry) of the virtual storage subsystem management table T2000 is composed of model entry T2010, serial number (S/N) entry T2020, port IP address entry T2030, number of volumes entry T2040, number of ports entry T2050, number of parity groups entry T2060, virtual logical partition ID (vRSG ID) entry T2070, and configuration logical partition ID (RSG ID) entry T2080. The model entry T2010 and the serial number (S/N) entry T2020 are, respectively, the entries for registering the model (product name and model name) and the serial number (S/N) of the virtual storage subsystem 3000. The port IP address entry T2030 is an entry for registering the IP address of the management port of the virtual storage subsystem 3000. The management port of the virtual storage subsystem 3000 assigns an IP address having a different name through IP alias or other techniques to the management port 2500 of any one of the storage subsystems 2000 constituting the virtual storage subsystem 3000, and uses the same as a management port IP address for the virtual storage subsystem 3000.

The number of volumes entry T2040 stores a maximum number of volumes assigned to the virtual storage subsystem

3000. This value is set when the administrator creates and defines the virtual storage subsystem 3000, and even the virtual storage subsystems of the same model (same model provided from the same vender) may have different maximum numbers of volumes according to the definitions of the respective virtual storage subsystems. For example, the virtual storage subsystem registered in the first row of FIG. 10, that is, the storage subsystem whose model (T2010) is VSP and S/N (T2020) is 1111 has a maximum volume number T2040 of 8192, but on the other hand, the storage subsystem of the entry of the second row whose model (T2010) is VSP and S/N (T2020) is 1212 has a maximum volume number T2040 of 16384.

The number of ports entry T2050 store a maximum number of ports assigned to the virtual storage subsystem 3000. Similar to the value stored in the number of volumes entry T2040, this value is set when the administrator creates and defines the virtual storage subsystem 3000, and the virtual storage subsystems of the same model (same model provided from the same vender) may have different maximum numbers of ports according to the definitions of the respective virtual storage subsystems.

The number of parity groups entry T2060 stores a maximum number of parity groups assigned to the virtual storage subsystem 3000. Similar to the value stored in the number of volume entry T2040, this value is a value set when the administrator creates and defines the virtual storage subsystem 3000, and the virtual storage subsystems of the same model (same model provided from the same vender) may have different numbers of maximum parity groups according to the definitions of the respective virtual storage subsystems.

The virtual logical partition ID (vRSG ID) entry T2070 registers the ID of the virtual logical partition 3700 that the corresponding virtual storage subsystem 3000 has. Here, the vRSG ID (T2070) is composed of an entry T2071 for registering identifiers (hereinafter called global IDs) for uniquely specifying one or more virtual logical partitions 3700 of the multiple virtual storage subsystems 3000 managed by the virtualization management program 4110 executed by the management computer 4000, and an entry T2072 for registering identifiers (hereinafter called local IDs) capable of uniquely specifying the virtual logical partition 3700 within the virtual storage subsystem 3000 (the virtual storage subsystem specified by the model entry T2010 and the S/N entry T2020).

A configuration logical partition ID (RSG ID) entry T2080 stores an ID (RSG ID) of a logical partition associated with the virtual logical partition 3700 specified by the vRSG ID entry T2070. Here, the form of description of an RSG ID stored in the configuration logical partition ID (RSG ID) entry T2080 utilizes an ID (a set of subsystem model and subsystem serial number; which can be the same form of representation as the information stored in the entry T1120 of the storage subsystem interconnect information T1100) capable of uniquely specifying the storage subsystem 2000 to which the logical partition belongs, and a logical partition ID (RSG ID T2350C of FIG. 3), which are connected via a period (for example, VSP.111111.RSG01).

Next, we will describe the management information of the resource belonging to the virtual logical partition. As mentioned earlier, the resource of the storage subsystem 2000 belongs to a logical partition and has assigned thereto a logical resource identifier unique within the logical partition, independently from the identifier of the actual resource. Similarly, the resource within the logical partition belongs to the virtual logical partition mapped to the logical partition, which has a virtual resource identifier unique within the virtual logical partition assigned thereto for management. FIG. 11 is a view showing a configuration example of a virtual logical partition resource management table T2500. The virtual logical partition resource management table T2500 is a table for managing identifiers (IDs) of resources (virtual resources) belonging to the respective virtual logical partitions, which is maintained and managed by the management computer 4000. The virtual logical partition resource management table T2500 includes a vRSG ID entry T2500A, a virtual resource ID entry T2500b, an RSG ID entry T2500C, and a logical resource ID entry T2500D.

The logical resource ID entry T2500D and the RSG ID entry T2500C are entries storing the logical resource identifier of a resource and the IDs of the logical partition to which the resource belongs, wherein these two information enable to uniquely specify resources of all storage subsystems 2000 managed by the management computer 4000. The vRSG ID entry T2500A and the virtual resource ID entry T2500B store the virtual logical partition to which the resource specified by the logical resource ID entry T2500D and the RSG ID entry T2500C belong, and an identifier of the virtual resource assigned to that resource (virtual resource identifier). The present embodiment assumes that a local ID is stored in the vRSG ID entry T2500A, but a global ID can be stored instead.

FIG. 12 illustrates an example of a logical partition correlation bitmap which is an operation limitation information among the virtual logical partitions 3700. One logical partition correlation bitmap is defined for each set of a pair of virtual logical partitions 3700 of all the virtual logical partitions 3700 included in all the virtual storage subsystems 3000 managed by the management computer 4000. The logical partition correlation bitmap is a bitmap having a ten-bit configuration from bit 0 to bit 9, wherein each bit represents whether a given resource management operation can be performed or not. When the bit value is "1", it means that a resource management operation corresponding to that bit can be performed using resources within a pair of virtual logical partitions 3700, and when the bit value is "0", it means that a resource management operation corresponding to that bit cannot be performed using resources within the pair of virtual logical partitions 3700.

Bits from address 0 to address 2, and from address 4 to address 6 relate to whether management operations executed only using resources within a single storage subsystem 2000 can be performed or not. Further, the bits from address 7 to address 9 and the bit of address 3 relate to whether management operations using resources belonging to different storage subsystems 2000 can be performed or not, one example of which is a remote copy function (a remote copy function is a management operation using resources belonging to different storage subsystems 2000 by designating a volume of the storage subsystem 2000a and a volume of the storage subsystem 2000b as resources and constituting a pair relationship between the volume of the storage subsystem 2000a and the volume of the storage subsystem 2000b, which is a function for executing replication of (duplexing) a volume). Hereafter, the contents of the management operations represented by the respective bits will be described.

The bits of address 0 and address 1 relate to volume creation, wherein address 0 is a bit showing whether the operation for creating a volume from a parity group or a pool is possible or not. For example, if the address 0 of the logical partition correlation bitmap showing the relationship between the virtual logical partition 1 and the virtual logical partition 2 of FIG. 7 is "1", it means that the creation of a volume in the virtual logical partition 1 using the storage area within the parity group belonging to the virtual logical partition 2 (or opposite) is possible. Address 1 shows whether operation for connecting the volumes belonging to respective virtual logical partitions 3700 (such as virtual logical partition 1 and virtual logical partition 2 of FIG. 7) via an expanded volume creating function and providing the same as a single volume to the host computer 1000 is possible or not.

The bits of address 2 and address 3 relate to creating a logical path from the host computer 1000 to a volume in the storage subsystem 2000. Address 2 shows whether the operation for creating a logical path using only resources within a single storage subsystem 2000 is possible or not. As an example, when multiple storage subsystems (such as the storage subsystems 2000a and 2000b) are tightly coupled, it is possible to set both a logical path to enable the volume of the storage subsystem 2000a to be accessed from the host computer through a port of the storage subsystem 2000a and a logical path to enable the volume to be accessed from the host computer through a port of the storage subsystem 2000b. Therefore, when the storage subsystems 2000a and 2000b are tightly coupled, "1" is set to the address 2 of the logical partition correlation bitmap defined with respect to the pair of virtual logical partitions mapped to the logical partitions of the storage subsystems 2000a and 2000b.

On the other hand, address 3 illustrates whether it is possible to perform operation for generating a logical path using the resources of two loosely coupled storage subsystems 2000. As an example, when multiple storage subsystems (such as storage subsystems 2000a and 2000b) are loosely coupled, "1" is set to address 3 of the logical partition correlation bitmap. In this case, it is possible to set up a logical path to enable the host computer 1000 to access the volume of the storage subsystem 2000a through the port of the storage subsystem 2000b, but when an access command is received from the host computer to the volume having the above-described logical path set thereto, a process is performed to transfer the command received via the port of the storage subsystem 2000b to the storage subsystem 2000a via the FC interface, so that the response time is extended compared to when the host computer 1000 accesses the volume of the storage subsystem 2000b via the port of the storage subsystem 2000b.

Address 4 illustrates an operation to create a capacity virtualization pool (DP pool). Here, when the value of address 4 is "1", it shows that the volumes within the two virtual logical partitions 3700 set as a pair can be determined as the components of a single DP pool (that is, the DP pool is formed so as to extend over two virtual logical partitions) (corresponding to a case where two virtual logical partitions 3700 forming a pair are each mapped to tightly coupled storage subsystems 2000), and when the value is "0" (corresponding to a case where two virtual logical partitions 3700 forming a pair are each mapped to loosely coupled storage subsystems 2000), it shows that the operation cannot be performed.

The bits of address 5 and address 6 relate to whether forming a volume replication configuration (also referred to as local copy configuration within the virtual storage subsystem 3000) is possible or not, which is referred to as a "local copy related bit" in the following description. Address 5 shows whether it is possible to perform an operation to form a local copy configuration using volumes within two virtual logical partitions 3700 forming a pair, and address 6 shows whether it is possible to perform an operation to form a local copy configuration capable of managing differences using volumes within two virtual logical partitions 3700 forming a pair.

When multiple storage subsystems (such as the storage subsystems 2000a and 2000b) are loosely coupled, there is a limitation that volume copy between storage subsystems 2000a and 2000b using a local copy function cannot be performed, so that "0" is set to addresses 5 and 6 in the logical partition correlation bitmap defined regarding the pair of virtual logical partitions mapped to the logical partitions of the storage subsystems 2000a and 2000b. On the other hand, when the storage subsystems 2000a and 2000b are tightly coupled, volume copy between the storage subsystems 2000a and 2000b using the local copy function can be performed, so that "1" is set to addresses 5 and 6 in the logical partition correlation bitmap defined regarding the pair of virtual logical partitions mapped to the logical partitions of the storage subsystems 2000a and 2000b.

The bits from address 7 to address 9 relate to constituting a remote copy configuration between the virtual storage subsystems 3000 and whether operation of a pair of a copy source volume and a copy destination volume is possible or not, which is called a "remote copy related bit" in the following description. Address 7 shows whether a synchronous remote copy configuration can be formed or not, address 8 shows whether an asynchronous remote copy configuration can be formed or not, and address 9 shows whether a journal storage type remote copy configuration can be formed or not.

FIG. 13 is a configuration example of a logical partition correlation management table T3000 for managing a logical partition correlation bitmap described in FIG. 12. The management computer 4000 creates a single logical partition correlation bitmap for each of the pairs composed of two virtual logical partitions from all the virtual logical partitions managed by the management computer 4000, and stores the same in the logical partition correlation management table T3000. The logical partition correlation management table T3000 is generated by the virtualization management program 4110, and when the storage administrator outputs a management operation request of the virtual storage subsystem 3000 to the management computer 4000, the table is referred to by the storage subsystem management program 4120. The method for registering the logical partition correlation bitmap to the logical partition correlation management table T3000 will be described later. The logical partition correlation management table T3000 is composed of an entry T3010 for registering the ID (global ID) of the virtual logical partition 3700, an entry T3020 for registering the ID (global ID) of the virtual logical partition 370 which forms a pair with the virtual logical partition 3700 registered in T3010, and an entry T3030 for registering the logical partition correlation bitmap corresponding to the pair of virtual logical partitions specified by the IDs stored in entry T3010 and entry T3020.

The real storage subsystem management table T1000, the virtual storage subsystem management table T2000, the virtual logical partition resource management table T2500 and the logical partition correlation management table T3000 are stored in the storage media 4300 of the management computer 4000, and are expanded in the memory 4100 when the virtualization management program 4110 and the storage subsystem management program 4120 register or refer to the information.

FIG. 14 illustrates an example of a virtual storage subsystem creation screen V1000. The management computer 4000 can display this screen on an output unit (such as a display) that the computer has by executing the virtualization management program 4110. In another example, a management client terminal connected to the management computer 4000 via a LAN can receive information from the virtualization management program 4110 and display this screen on the display of the management client terminal. The virtual storage subsystem management screen V1000 has a table V1010 and a text box V1020 for displaying a table of the existing virtual storage subsystems 300 managed by the virtualization management program 4110 and the numbers thereof. The administrator can confirm all the virtual storage subsystems 3000 managed by the management computer 4000 via the table V1010 and the text box V1020.

Further, the storage subsystem management screen V1000 includes entry boxes V1030 to V1090 for entering information necessary for newly creating (defining) the virtual storage subsystem 3000, an "execute" button V1100 for transmitting a request to create a virtual storage subsystem, a "cancel" for cancelling input, and a "back" button V1120 to exit the virtual storage subsystem management screen V1000. The administrator can use an input device of the management computer 4000 or the management client terminal to enter necessary information.

For example, the administrator can select a model name of the virtual storage subsystem being newly created through the entry box V1030, and enter a serial number of the virtual storage subsystem being newly created through the entry box V1040. According to the present embodiment, the information on the serial number is manually entered by the administrator, but the serial number can be automatically generated via the virtualization management program 4110 and displayed on the entry box V1040.

The entry box V1060 is a box for entering the IP address of the management port of the newly created virtual storage subsystem 3000, the value of which shows the IP address for the newly created virtual storage subsystem. In the present embodiment, the IP address is entered manually by the administrator, but it is also possible to adopt a configuration where the virtualization management program 4110 automatically creates the IP address (such as via a method of selecting and creating an IP address excluding the IP address for the management port set to other virtual storage subsystems 3000) and displays the same on the entry box V1060. Entry boxes V1070 through V1090 are entry boxes for entering the number of resources of the newly created virtual storage subsystem, and the administrator can enter the number of respective resources using entry boxes V1070 through V1090 for newly creating the virtual storage subsystem.

As described above, the administrator uses the virtual storage subsystem management screen V1000 to enter the setting information (such as the management port IP address or the number of ports) of the newly created virtual storage subsystem, presses the button V1100 and transmits the virtual storage creation request to (the virtualization management program 4110 of) the management computer 4000. The virtualization management program 4110 having received the virtual storage creation request adds (newly creates) an entry to the virtual storage management table T2000 based on the setting information (information entered in V1030, V1040, V1060, V1070, V1080 and V1090) of the virtual storage subsystem received together with the virtual storage creation request. At this point of time, the information of the virtual logical partition and the logical partition, that is, the information stored in the entries of vRSG ID (T2070) and RSG ID (T2080) of the virtual storage management table T2000 is not determined, so that an invalid value (such as null) is stored in the entries of the vRSG ID (T2070) and RSG ID (T2080). Further, the content of the virtual storage management table T2000 having the entry added is transmitted to the respective storage subsystems 2000, and the table is also managed in the respective storage subsystems 2000.

Figure 15:
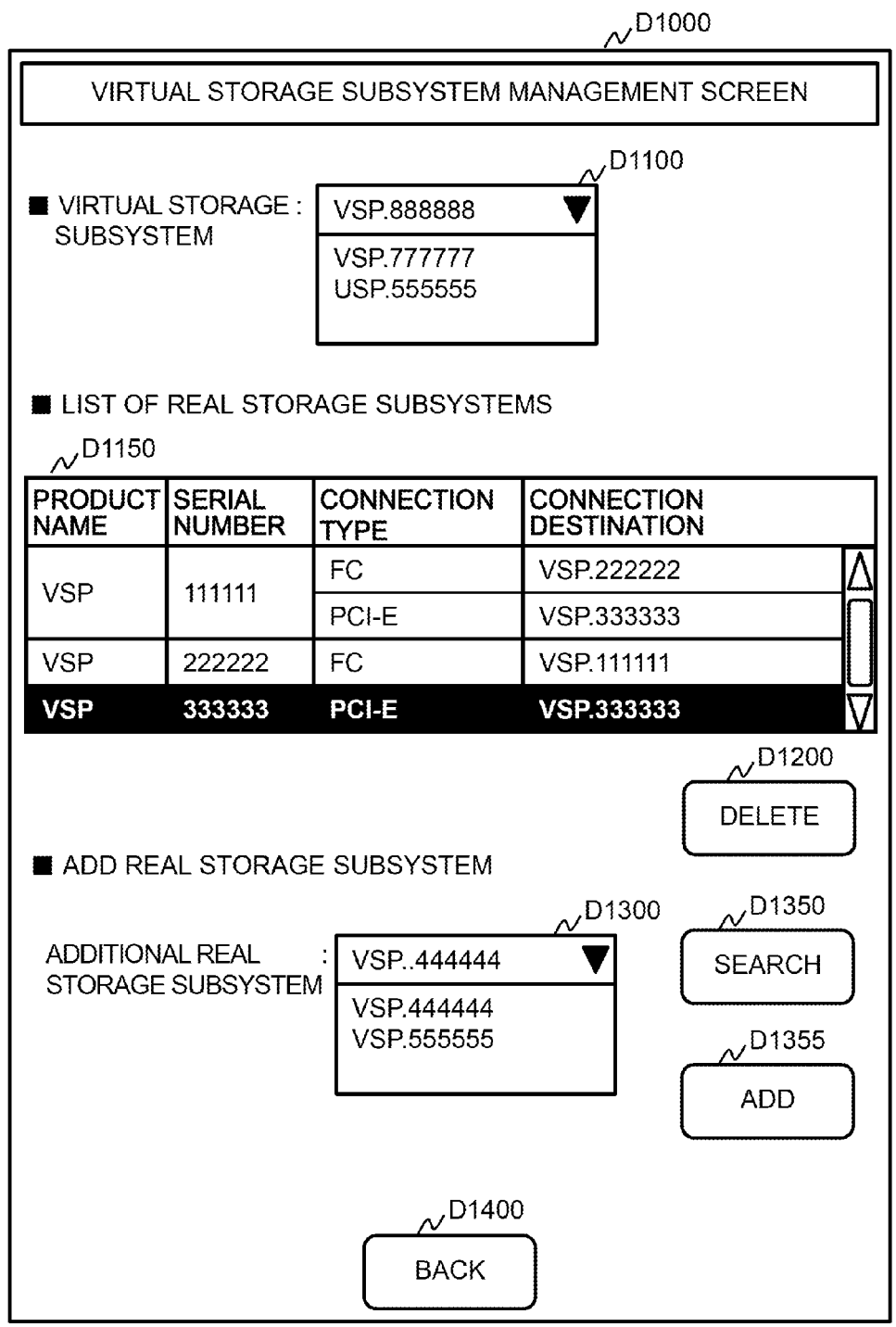
FIG. 15 shows a configuration example of the virtual storage subsystem management screen provided by the virtualization management program.

After the virtual storage subsystem 3000 is created, the screen displayed on the management computer 4000 transits to a screen for having a real storage subsystem 2000 mapped to the virtual storage subsystem 3000 (screen D1000 of FIG. 15). FIG. 15 is one example of a virtual storage subsystem management screen D1000 that the virtualization management program 4110 provides to the storage administrator. The virtual storage subsystem management screen D1000 includes a select bar D1100 for selecting the virtual storage subsystem 3000 being the management target of the virtualization management program 4110, a select table D1150 showing the connection configuration between a table of storage subsystems 2000 constituting the virtual storage subsystem 3000 selected in D1100 and the storage subsystems 2000, and a select bar D1300 for selecting a storage subsystem 2000 that can be added as the storage subsystem 2000 constituting the virtual storage subsystem 3000.

When a delete button D1200 is pressed, the process of the virtualization management program 4110 for deleting the real storage subsystem selected in the real storage subsystem list from the storage subsystems constituting the virtual storage subsystem 3000 selected in the select bar D1100 is executed.

When a search button D1350 is pressed, the virtualization management program 4110 extracts the storage subsystem 2000 connected to the real storage subsystem 2000 constituting the virtual storage subsystem 3000 selected in the select bar D1100 from the real storage subsystem management table T1000, and refers to the extracted storage subsystem and the virtual storage subsystem management table T2000 to display a storage subsystem that is not registered to the entry T2080 of the row corresponding to the virtual storage subsystem 3000 selected in the select bar D1100 on the select bar D1300. Immediately after the virtual storage subsystem 3000 is created and when not even a single storage subsystem 2000 is mapped to the virtual storage subsystem 3000, all the storage subsystems 2000 managed by the management computer 4000 are displayed on the select bar D1300.

In the select bar D1300, multiple storage subsystems 2000 can be selected to be added to the virtual storage subsystem 3000. When the administrator selects the storage subsystem to be added on the select bar D1300 and presses the add button P1355, a process for adding the storage subsystem is executed by the virtualization management program 4110. Now, the process for adding a storage subsystem will be described with reference to FIG. 16 through FIG. 19.

Figure 16:
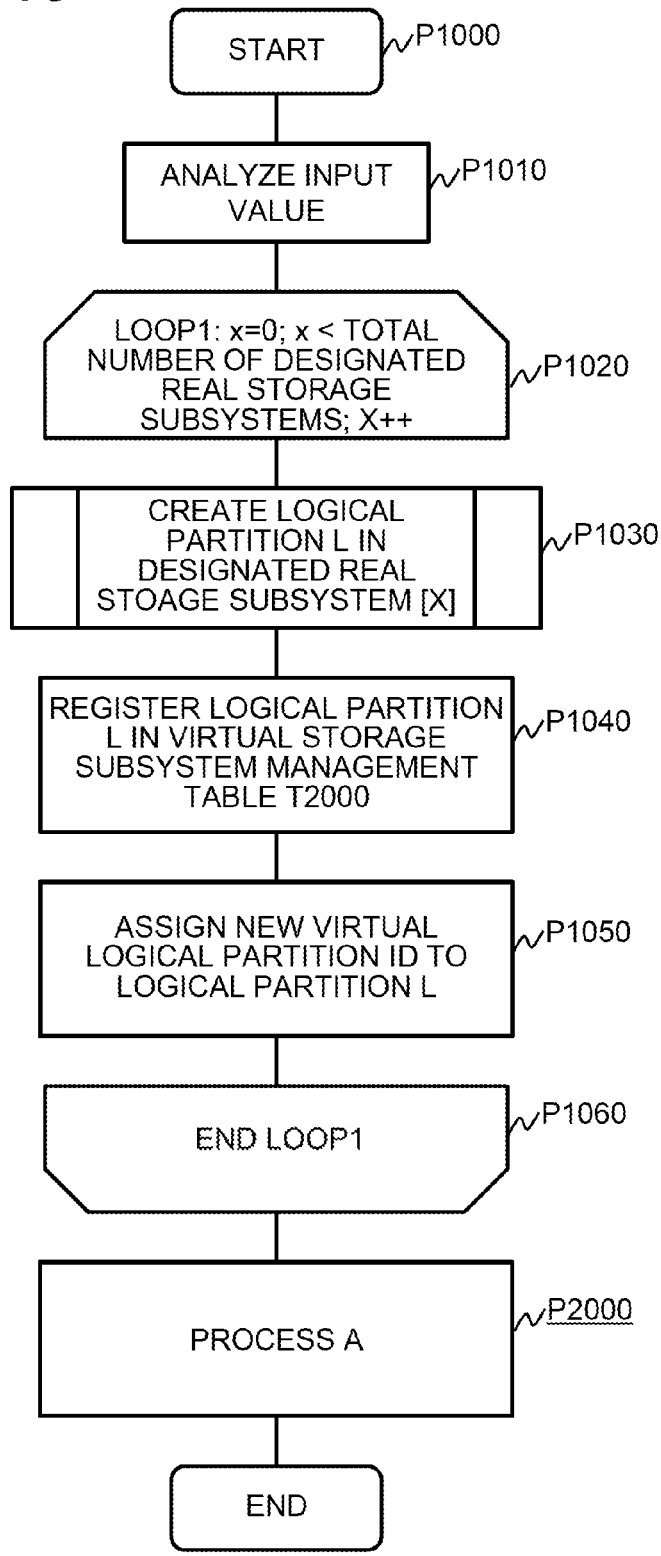
FIG. 16 is a flowchart of a real storage subsystem adding process.

FIG. 16 is a flowchart illustrating a storage subsystem adding process executed by the virtualization management program 4110. When the add button P1355 is pressed, the virtualization management program 4110 executes an input analysis (step P1010) for extracting the ID of the virtual storage subsystem 3000 selected via the select bar D1100 and the ID of the added storage subsystem 2000 selected via the select bar D1300, and thereafter, executes a process of LOOP1 (steps P1020 through P1060) to all the selected additional storage subsystems 2000.

In LOOP1, an instruction is output to the additional storage subsystem 2000 to newly create a logical partition 2700 (step P1030). The storage subsystem 2000 having received the instruction to newly create a logical partition 2700 creates the logical partition. At this time, only a logical partition is created. That is, the storage subsystem 2000 only performs a process to register the ID (RSG ID) of the newly created logical partition to the logical partition management table T2360 that it manages, and does not execute a process to register resources such as ports to the logical partition. When the storage subsystem 2000 creates a logical partition, the ID (RSG ID) of the created logical partition is returned to the virtualization management program 4110.

Next, the procedure selects a row corresponding to the virtual storage subsystem 3000 obtained through input analysis (step P1010) out of the rows of the virtual storage subsystem management table T2000, registers the logical partition created in step P1030 to the entry (T2080) of the configuration logical partition ID of that row (step P1040), and registers a new vRSG ID to the virtual logical partition ID entry T2070 (step P1050). Upon registering a new vRSG ID, a global ID is selected so as not to overlap with the global ID already registered in the own virtual storage subsystem and other virtual storage subsystems, and a local ID is also selected so as not to overlap with the local ID already registered in the own virtual storage subsystem, which are then registered. When the processes of steps P1030 to P1050 are completed for all additional storage subsystems, a process for creating a logical partition correlation bitmap (step P2000: process A) is performed, and the process is ended.

Figure 17:
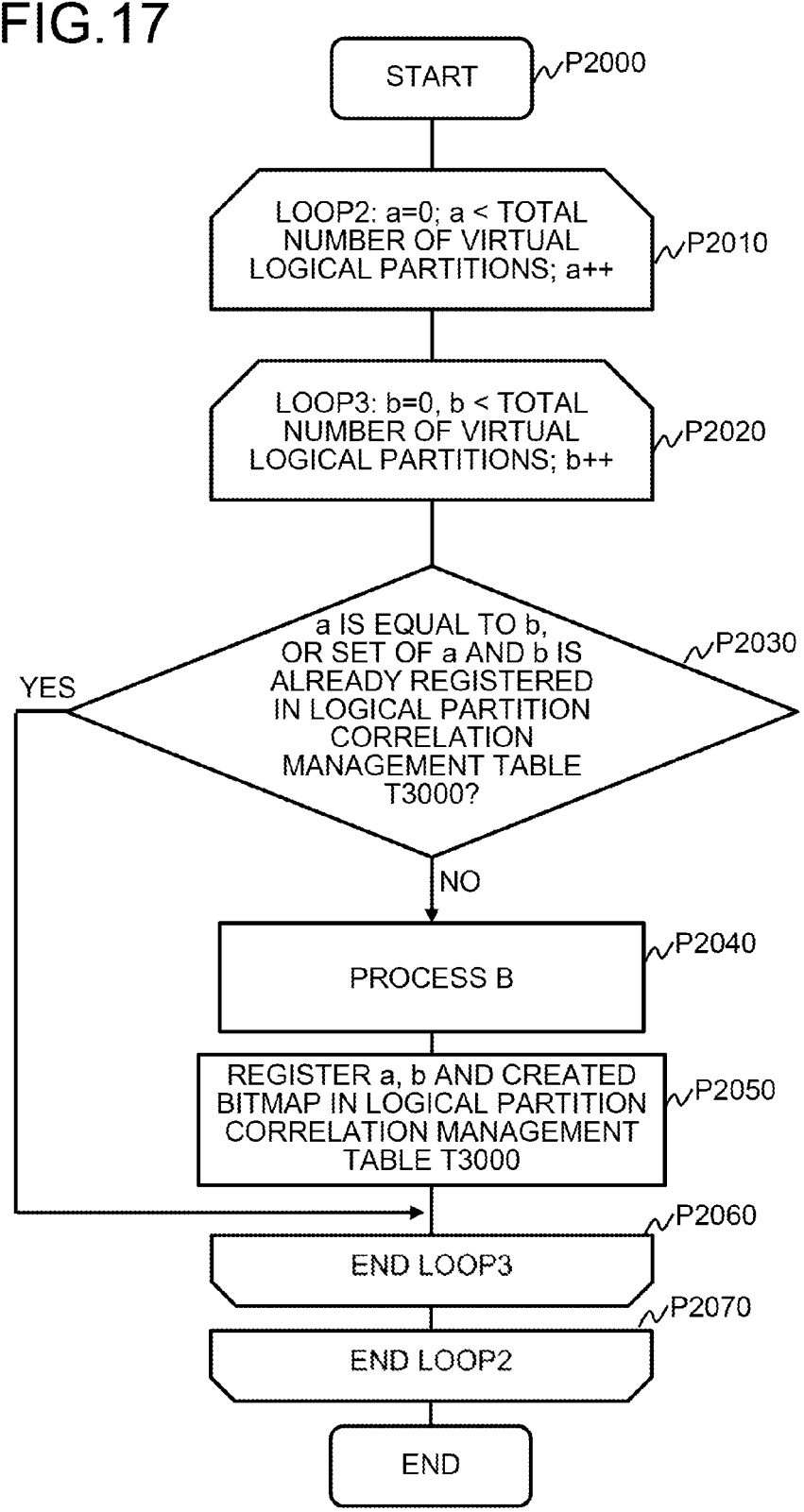
FIG. 17 is a flowchart of a logical partition correlation bitmap creation process.

FIG. 17 is a flowchart illustrating process A, that is, a process for creating a logical partition correlation management table T3000. The process of FIG. 17 is a process for creating a logical partition correlation bitmap for the combinations of all virtual logical partitions managed by the management computer 4000 when executing this process.

At first, variables a and b are prepared, and initial values (0) are substituted to variables a and b (steps P2010 and P2020). Next, in step P2030, it is determined whether a logical partition correlation bitmap related to the set of a virtual logical partition where the virtual logical partition ID (global ID) is equal to variable a (hereinafter abbreviated as "virtual logical partition a") and a virtual logical partition where the virtual logical partition ID (global ID) is equal to variable b (hereinafter abbreviated as "virtual logical partition b") is already registered in the logical partition correlation management table T3000, or whether the values of a and b are equal, and when any one of the conditions are matched, the procedure advances to step P2060. In step 2030, if the values of a and b differ, and the logical partition correlation bitmap related to the set of virtual logical partition a and virtual logical partition b is not registered in the logical partition correlation management table T3000, a logical partition correlation bitmap create processing (process B) of the virtual logical partitions a and b is performed (step P2040), and after process B is completed, the set of virtual logical partitions a and b and the created logical partition correlation bitmap is registered in the logical partition correlation management table T3000 (step P2050).

After the processing of step P2050, the procedure returns to P2020, where variable b is incremented by 1, and the processes of steps P2030 through P2050 are repeated. When variable b reaches the total number of virtual logical partitions currently managed by the management computer 4000, the procedure returns to step P2010, where variable a is incremented by 1, and the processes of steps P2020 through P2050 are repeated. At the point of time when variable a reaches the total number of virtual logical partitions currently managed by the management computer 4000, that is, when steps P2030 through P2050 are executed for all the combinations of variables a and b, the process is ended.

Figure 18:
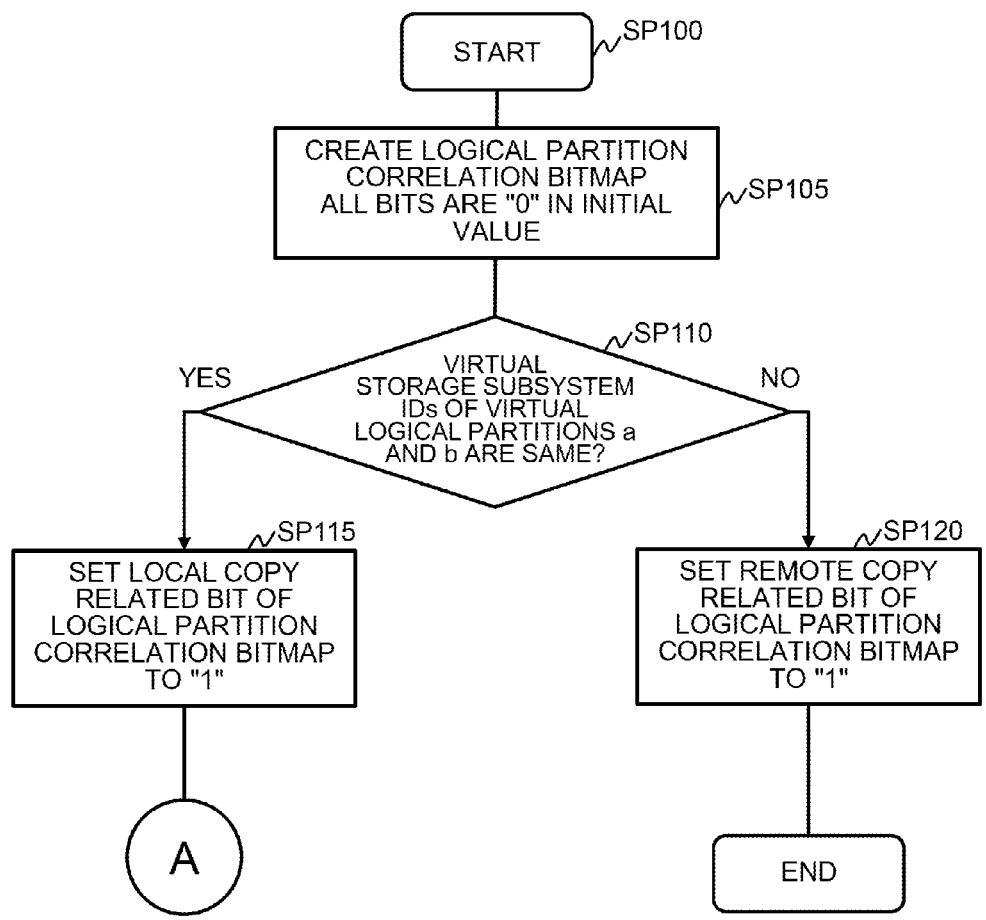
FIG. 18 is a flowchart of the logical partition correlation bitmap creation process.
Figure 19:
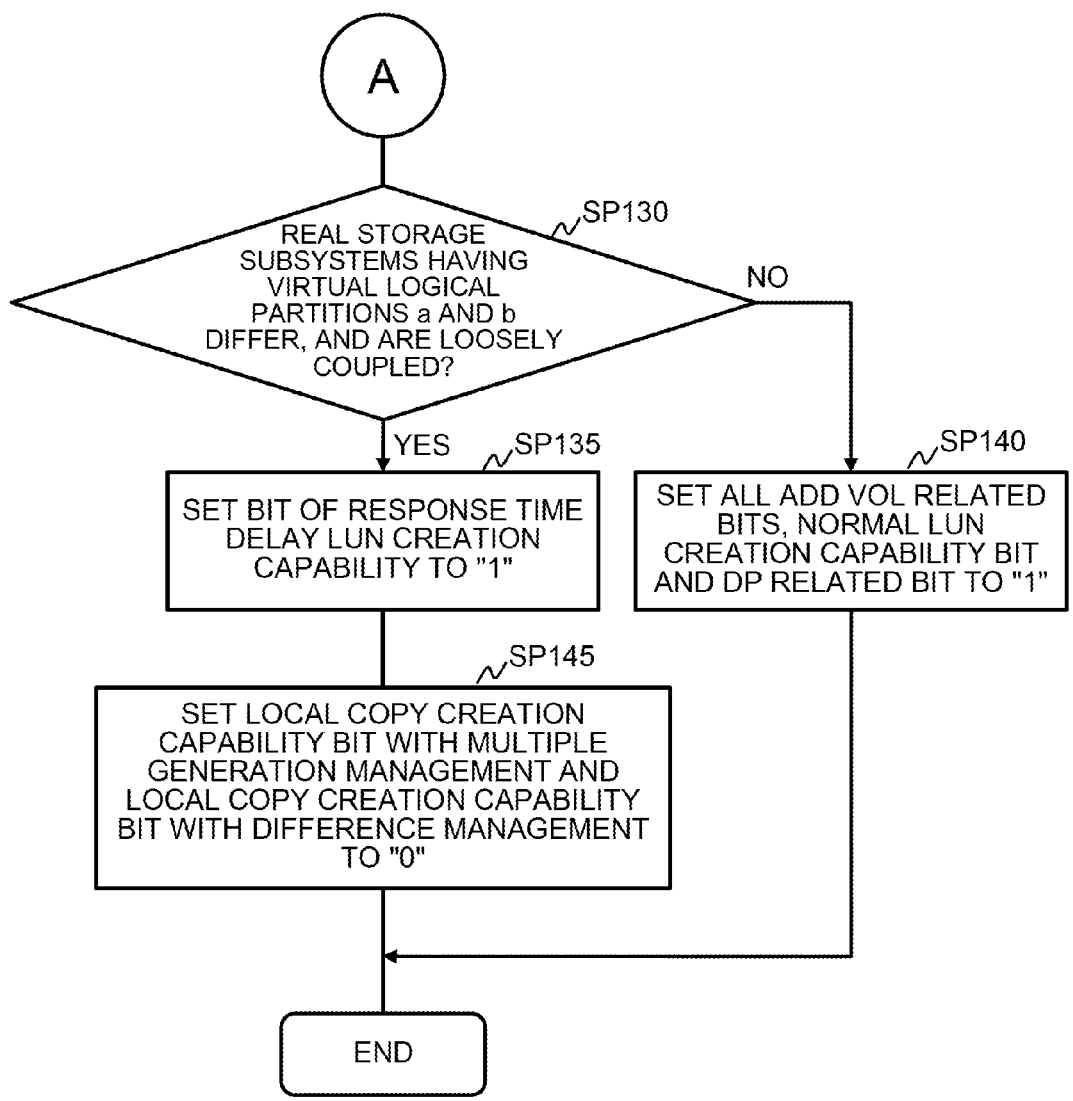
FIG. 19 is a flowchart of the logical partition correlation bitmap creation process.

FIGS. 18 and 19 are flowcharts showing process B of FIG. 17, that is, the process of creating a logical partition correlation bitmap. At first, a logical partition correlation bitmap is created where all the values are set to "0" (step SP105), and whether the virtual storage subsystem 3000 to which the virtual logical partition a belongs and the virtual storage subsystem 3000 to which the virtual logical partition b belongs are the same virtual storage subsystem 3000 or not is determined (step SP110). If the result is no in step SP110, all the values of the remote copy-related bits (bits of address 7 through address 9 of FIG. 8) in the logical partition correlation bitmap are set to "1" (step SP120), and the process is ended. If the result is yes in step SP110, the values of all the local copy-related bits (bits of addresses 5 and 6 of FIG. 8) are set to "1" (step SP115), and the procedure advances to steps SP130 and thereafter (FIG. 19).

In step SP130, the procedure refers to the value of entry T2080 in the virtual storage management table T2000 and the value of entry T1030 of the real storage subsystem management table T1000, and determines whether the configuration of the logical partitions 2700 corresponding to the virtual logical partitions a and b are respectively in different storage subsystems 2000 and that the coupling between those storage subsystems 2000 is a loose coupling or not. If the result is yes (the configuration logical partitions 2700 corresponding to virtual logical partitions a and b are in different storage subsystems 2000 and that the coupling between the storage subsystems is a loose coupling), the value of the bit of address 3 of the logical partition correlation bitmap is set to "1" (step SP135), and further, the values of the bits for local copy forming operation for managing multiple generations and for local copy forming operation capable of management differences (bits of addresses 5 and 6 of FIG. 8) are set to "0" (step SP145) and the process is ended.

If the result is No in step SP130, it can be determined that there is no limitation in storage subsystem interconnection, so that the bits of volume create operation (bits of address 0 and address 1), the bit of logical path creation (bit of address 2) and the bit of DP pool creation operation extending over logical partitions (bit of address 4) are set to "1" (step SP140), and the process is ended.

When the above-described processes of FIGS. 16 through 19 are ended and the logical partitions and virtual logical partitions are registered to the storage subsystem 2000 and the virtual storage subsystem 3000, the virtual storage subsystem management table T2000 and the logical partition correlation management table T3000 are sent to the respective storage subsystems 2000, and are also stored in the respective storage subsystems 2000. Further, after the logical partitions and the virtual logical partitions are registered, the process for registering resources to the respective logical partitions is executed. The process of registering resources to the respective logical partitions is performed to the respective storage subsystems 2000 using a maintenance terminal (not shown) of the management computer 4000 or the storage subsystem 2000.

Figure 20:
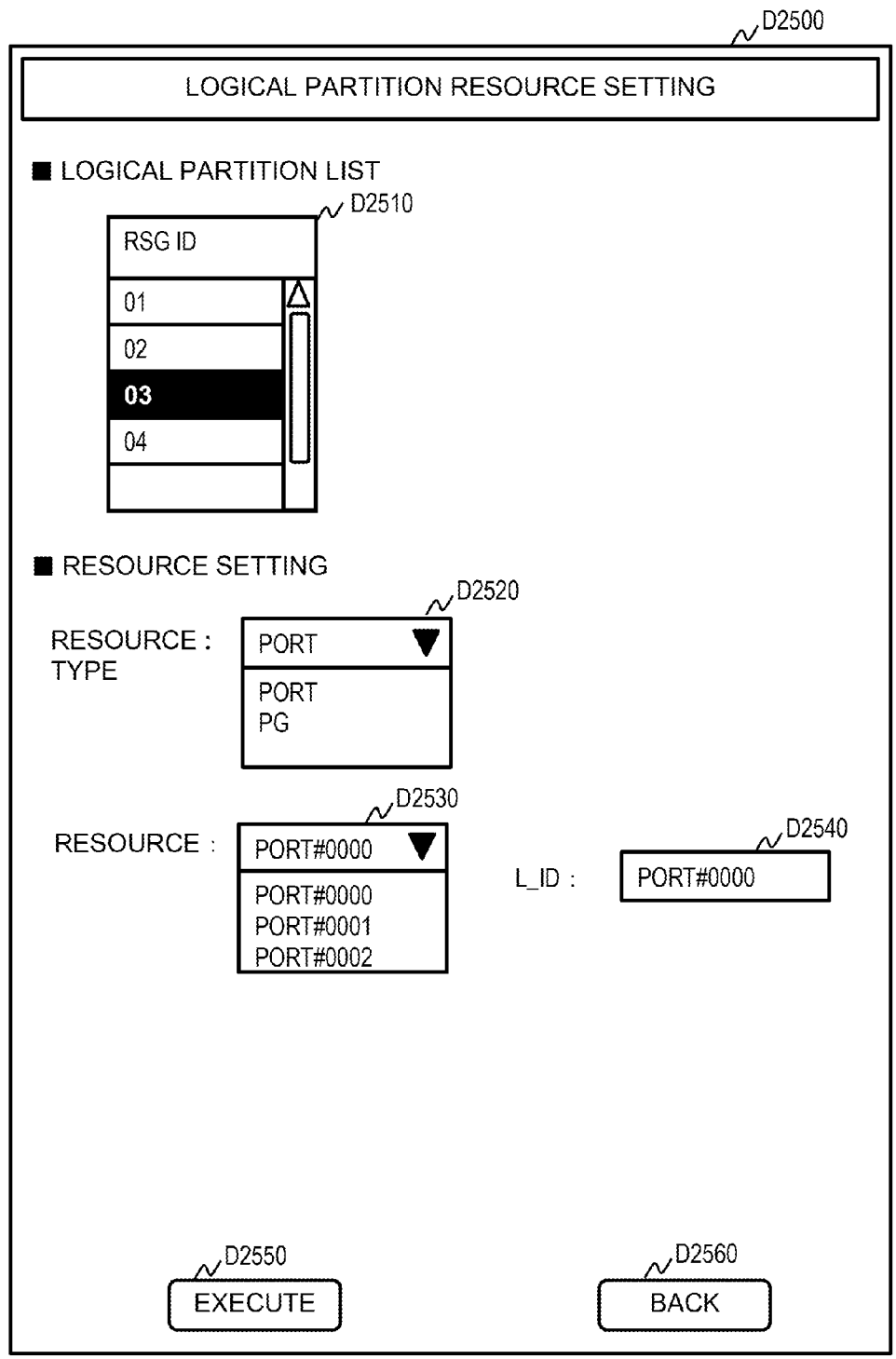
FIG. 20 is a configuration example of a resource registration screen to the logical partition.

FIG. 20 shows an example of a resource registration screen D2500 of a storage subsystem 2000 to a logical partition displayed on an output unit such as a display of a maintenance terminal of the management computer 4000. The maintenance program executed in the maintenance terminal or the storage subsystem management program 4120 executed in the management computer 4000 displays this screen on the output unit (such as the display) of the maintenance terminal or the management computer 4000, and the administrator of the storage subsystem 2000 can register resources to the respective logical partitions of the storage subsystem 2000 through this screen. The method for registering resources to the logical partitions is not limited to the method described above, and other methods can be adopted.

The resource registration screen D2500 includes a table D2510 displaying a list of logical partitions created in the storage subsystem 2000, a table D2520 for selecting the types of registration target resources to the logical partition, a table D2530 displaying a list of resources within the storage subsystem 2000, a text box D2540, an execute button D2550, and a return button D2560.

When the administrator of the storage subsystem 2000 selects one target logical partition for registering resources from the table D2510, the maintenance program or the storage subsystem management program 4120 acquires the resource ID management table 2350 from the storage subsystem 2000, extracts a list of resources that are not registered in any of the logical partitions out of the resources of the type designated in the table D2520, and displays a list of extracted resources in the table D2530. Next, when the administrator of the storage subsystem 2000 selects one of the resources displayed in D2530, in order to assign an identifier to the selected resource, the maintenance program or the storage subsystem management program 4120 automatically displays an unused logical resource ID to the text box D2540. The administrator can manually correct the logical resource ID displayed on the text box D2540.

Next, when the administrator of the storage subsystem 2000 presses the execute button D2550, the maintenance program or the storage subsystem management program 4120 registers the resource selected in the table D2530 as a resource to be registered to the logical partition selected in D2510 to the storage subsystem 2000. Actually, the set of information of a resource selected in the table D2530, the resource type selected in D2520, the logical partition ID (RSG ID) selected in D2510, and the identifier (logical resource ID) of the resource entered in D2540 is registered in the entries of RSG ID (T2350C), type (T2350B), real resource ID (T2350A) and logical resource ID (T2350D) of the resource ID management table T2350.

FIG. 21 illustrates an example of a resource registration screen D3500 to the virtual logical partition displayed on the output unit such as a display of the management computer 4000. The virtualization management program 4110 executed in the management computer 4000 displays this screen on the output unit (such as a display) of the management computer 4000, and the administrator can register resources to the respective virtual logical partitions managed by the management computer 4000 through this screen.

The virtual resource registration screen D3500 includes a table D3510 displaying a list of the respective virtual logical partitions managed by the management computer 4000, a table D3520 for allowing selection of the type of resources being the registration target to the virtual logical partition, a table D3530 for displaying a list of resources capable of being registered, a text box D3540, an execute button D3550, and a back button D3560.

The table D3510 shows a list of sets of a storage subsystem ID (set of system model and S/N) and a virtual logical partition ID (vRSG ID) for each virtual logical partition managed by the management computer 4000. When the administrator selects one target virtual logical partition for registering resources and one type of the resource to be registered from the tables D3510 and D3520, the virtualization management program 4110 displays a list of resources matching the resource type selected in the table D3520 out of the resources registered in the logical partition mapped to the vRSG ID designated in D3510 on the table D3530. In other words, the resources capable of being registered to the virtual logical partition are restricted to the resources within the logical partitions mapped to the virtual logical partitions.

The subsequent operations are similar to the operations of the process for registering a resource to the logical partitions. That is, the administrator selects one of the resources displayed in D3530, enters the identifier (virtual resource ID) assigned to the selected resource to the text box D3540, and presses the execute button D3550, based on which registration of a resource to the virtual logical partition is performed. This operation is repeated to register multiple resources.

The flow of the processes performed by the virtualization management program 4110 in the processing of the above-described operation will be described. The virtualization management program 4110 refers to the virtual storage management table T2000, and displays a list of the virtual logical partition IDs registered in the virtual storage management table T2000 on the table D3510. Thereafter, when the administrator selects the vRSG ID and the resource type from the tables D3510 and D3520, the storage subsystem 2000 having the logical partition corresponding to the vRSG ID designated in D3510 is specified from the information registered in the configuration logical partition ID (RSG ID) entry T2080 in the virtual storage management table T2000, and outputs an inquiry to the specified storage subsystem 2000 to acquire the resource ID management table T2350. Then, the row that matches the resource type selected from the table D2520 as type (T2350B) in the acquired resource ID management table T2350 is extracted, and the logical resource ID (T2350D) of that row is displayed on D3530.

Subsequently, when the administrator selects a resource from D3530, the virtualization management program 4110 creates a virtual resource ID unique within the virtual logical partition, and displays the same in D3540. The administrator is capable of correcting this virtual resource ID manually. When the administrator presses the execute button D3550, the virtualization management program 4110 registers the resource selected in the table D3530 as a resource of the virtual logical partition selected in D3510 to the virtual logical partition resource management table T2500. Actually, a set of vRSG ID selected in D3510, an identifier (virtual resource ID) of the resource entered in D3540, a resource information selected in the table D3530, an ID (RSG ID) of the logical partition corresponding to the vRSG ID designated in D3510, and a resource type selected in D3520 are registered to the entries of the vRSG ID (T2500A), the virtual resource ID (T2500B), the RSG ID (T2500C) and the logical resource ID (T2500D) of the virtual logical partition resource management table T2500.

Figure 22:
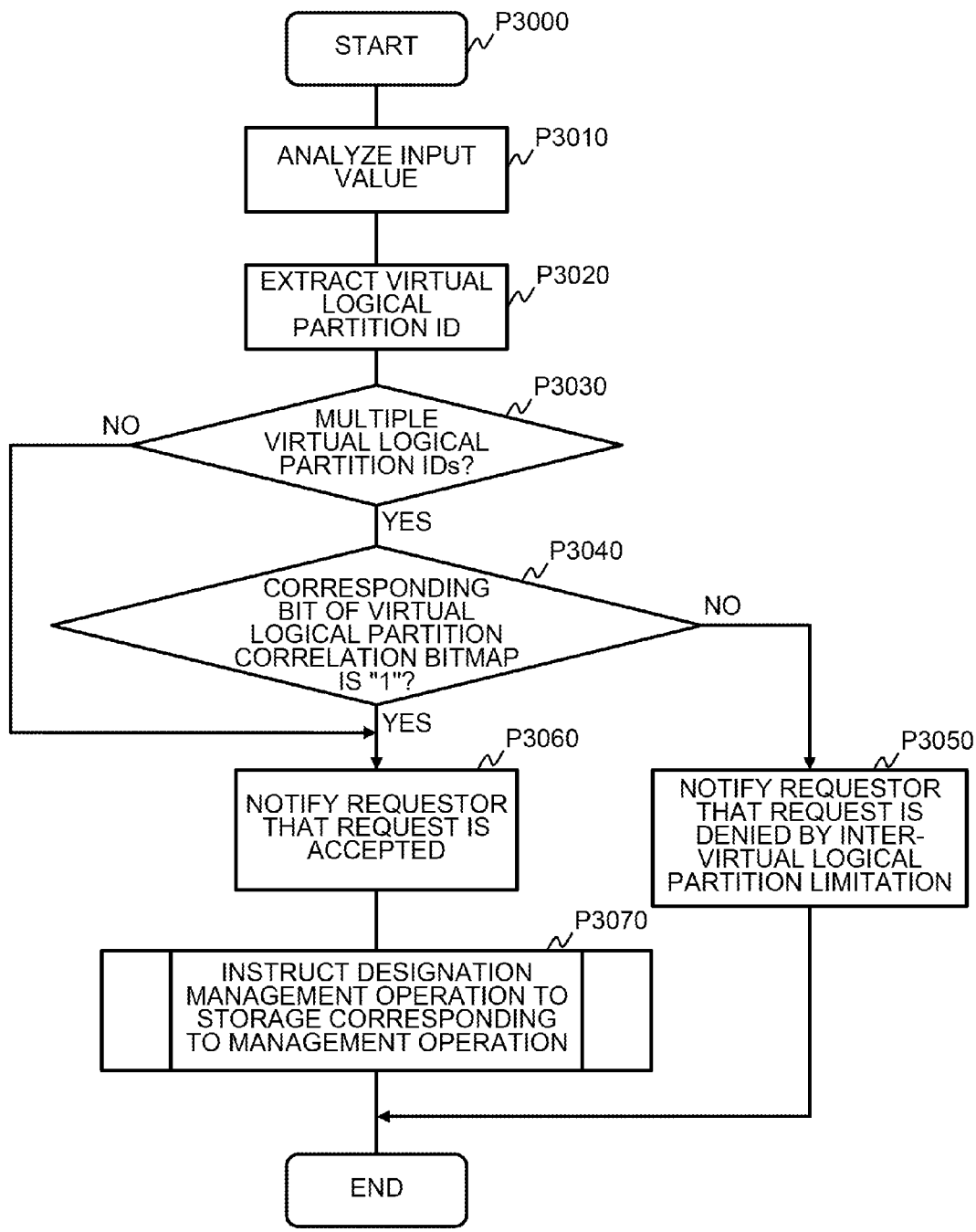
FIG. 22 is a flowchart of a management operation request processing using the logical partition correlation bitmap by the storage subsystem management program.

FIG. 22 is a flowchart showing the process for limiting operation when the storage subsystem management program 4120 receives a management operation request (instruction) of the virtual storage subsystem 3000 from the storage administrator. The operation for managing the virtual storage subsystem 3000 shows an example of the management operation (such as creating a volume pair in a local copy function) using the resources within a single virtual storage subsystem 3000.

The storage subsystem management program 4120 extracts the content of operation and the operation target resource included in the management operation instruction (step P3010). The operation target resource designated in the management operation instruction is represented by a set of information specifying the virtual storage subsystem (management port IP address of the virtual storage subsystem, or the model and serial number of the virtual storage subsystem), and a virtual resource ID of the operation target resource. The present embodiment assumes that a local ID is used as the virtual resource ID, but it is also possible to use a global ID. Generally, multiple resources are designated when designating an operation target resource via management operation instruction. For example, according to a certain management operation instruction, when an operation to create a pair of volumes in a local copy function is instructed as the operation content, two resources are simultaneously designated as the copy source volume and the copy destination volume. Therefore, the information designated by the management operation instruction includes the virtual resource IDs of the copy source volume and the copy destination volume.

Next, the procedure specifies the vRSG ID to which the extracted operation target resource belongs (step 3020). The storage subsystem management program 4120 can specify the vRSG ID to which the operation target resource belongs by referring to the virtual logical partition resource management table T2500. Next, when multiple vRSG IDs are extracted in step P3020, based on the set of vRSG IDs being extracted, the logical partition correlation bitmap is extracted from the logical partition correlation management table T3000, and the value of the bit representing the request operation is confirmed (step P3040). If the value is "0", a notice to reject the request due to limitations between virtual logical partitions is notified to the requestor (storage administrator) (step P3050), and the process is ended. If the value is "1", a notice that the request has been accepted is notified to the requestor (step P3060). Then, the resource information (virtual resource ID) designated by the management operation instruction is converted to the RSG ID (T2500C) and the logical resource ID (T2500D) using the vRSG ID information specified in P3020 and the virtual logical partition resource management table T2500. Since based on the information of the RSG ID (T2500C), it is possible to specify which storage subsystem 2000 the resource designated by the management operation instruction belongs, so that a request is transmitted to the corresponding storage subsystem 2000 (step P3070), and the process is ended. For example, if the management operation instruction is a pair formation instruction of volumes in the local copy function, an instruction to create a volume pair and the virtual resource ID of the copy source/copy destination volume are transmitted to the storage subsystem 2000 having the copy source volume (or the storage subsystem 2000 having the copy destination volume). Further, instead of transmitting the virtual resource ID to the storage subsystem 2000, it is possible to convert the virtual resource ID to the logical resource ID in the storage subsystem management program 4120, and transmit the logical resource ID to the storage subsystem 2000.

Further, when only one vRSG ID is extracted in step P3020 (when P3030: No), the processes of step P3060 and thereafter are performed.

The above description has described the operation limitation processing of the storage subsystem management program 4120 according to the present invention. According to the operation limitation processing of the storage subsystem management program 4120, the administrator managing the virtual storage system can comprehend the reason of rejection when an operation request is rejected, without having to acquire the configuration of the real storage subsystem.

REFERENCE SIGNS LIST

1000: Host computer
2000: Storage subsystem
2700: Logical partition
3000: Virtual storage subsystem
3700: Virtual logical partition
4000: Management computer
5000: Storage area network
6000: Management network
T1000: Real storage subsystem management table
T1100: Storage subsystem interconnect information
T2000: Virtual storage subsystem management table
T2350: Resource ID management table
T2360: Logical partition management table
T2500: Virtual logical partition resource management table
T3000: Logical partition correlation management table
D1000: Virtual storage subsystem management screen

The invention claimed is:

1. A storage system comprising multiple storage subsystems receiving access from a host computer, and a management computer managing the multiple storage subsystems; wherein
   each of the multiple storage subsystems has one or more resources;
   the storage system is configured to define a virtual storage subsystem including at least a portion of the resource of a first storage subsystem within the multiple storage subsystems and at least a portion of the resource of a second storage subsystem within the multiple storage subsystems, and receive a management operation request designating the virtual storage subsystem or a resource belonging to the virtual storage subsystem;
   upon receiving the management operation request designating multiple resources belonging to the virtual storage subsystem and a resource operation content, if the multiple resources are included in the same storage subsystem, the management computer transmits the management operation request to the said same storage subsystem; and
   if the multiple resources are included in different storage subsystems, the management computer determines whether the designated operation content can be executed or not, and if the designated resource operation content cannot be executed, notifies an operator that the designated resource operation content cannot be executed.

2. The storage system according to claim 1, wherein
   the virtual storage subsystem has one or more partitions defined therein, wherein each partition is mapped to one of the multiple storage subsystems;
   the multiple resources belonging to the virtual storage subsystem is managed to belong to any one of said partitions;
   when the multiple partitions are defined, the management computer creates a logical partition correlation information for each pair composed of two partitions out of the multiple partitions showing whether resource operation designating a resource belonging to said pair can be executed corresponding to each operation; and
   the management computer determines whether the designated resource operation can be executed or not based on the logical partition correlation information.

3. The storage system according to claim 2, wherein
   the first storage subsystem and the second storage subsystem have respective multiple interfaces for connecting with the host computer, at least one of the interfaces of the first storage subsystem and at least one of the interfaces of the second storage subsystem are mutually connected via a transmission line; and
   upon creating the logical partition correlation information defined with respect to a pair of a partition belonging to the first storage subsystem and a partition belonging to the second storage subsystem, the management computer includes in the logical partition correlation information an information specifying that the operation executed using only resources within a single storage subsystem cannot be performed.

4. The storage system according to claim 2, wherein
   the first storage subsystem and a third storage subsystem out of the multiple storage subsystems are connected via a second transmission line capable of transmitting data at a higher speed than the transmission line connecting the interfaces for connecting to the host computer, wherein the second transmission line mutually connects respective components within the first storage subsystem and respective components within the third storage subsystem; and upon creating the logical partition correlation information defined with respect to a pair of a partition belonging to the first storage subsystem and a partition belonging to the third storage subsystem, the management computer includes information showing that the operation executed using only resources within a single storage subsystem can be performed.

5. The storage subsystem according to claim 2, wherein
at least one of the multiple resources is a volume that the storage subsystem has, and the resource operation content is a replication instruction of the volume belonging to one of the virtual storage subsystems;

when the management computer receives a replication instruction defining two volumes belonging to one of the virtual storage subsystems as a copy source volume and a copy destination volume, the management computer determines whether the logical partition correlation information defined with respect to the pair belonging to different partitions indicates that execution of the replication is possible or not when the two volumes belong to different partitions;

as a result of the determination, if the logical partition correlation information indicates that the execution of the replication is not possible, the management computer notifies an operator that the replication instruction is rejected; and as a result of the determination, if the logical partition correlation information indicates that the execution of the replication is possible, the management computer specifies a storage subsystem having the volume, and transmits the replication instruction to the specified storage subsystem.

6. A management computer for managing multiple storage subsystems receiving access from a host computer; wherein
each of the multiple storage subsystems has one or more resources;

the management computer is configured to define a virtual storage subsystem including at least a portion of the resource of a first storage subsystem within the multiple storage subsystems and at least a portion of the resource of a second storage subsystem within the multiple storage subsystems, and receive a management operation request from an operator designating the virtual storage subsystem or a resource belonging to the virtual storage subsystem;

upon receiving the management operation request designating multiple resources belonging to the virtual storage subsystem and a resource operation content, if the multiple resources are included in the same storage subsystem, the management computer transmits the management operation request to said same storage subsystem; and if the multiple resources are included in different storage subsystems, determines whether the designated operation can be executed or not, and if the designated operation cannot be executed, the management computer notifies an operator that the designated operation cannot be executed.

7. The management computer according to claim 6, wherein
the virtual storage subsystem has one or more partitions defined therein, wherein each partition is mapped to one of the multiple storage subsystems, and the multiple resources belonging to the virtual storage subsystem is managed to belong to any one or more of said partitions;

when the multiple partitions are defined, the management computer creates a logical partition correlation information for each pair composed of two partitions out of the multiple partitions showing whether an operation designating a resource belonging to said pair can be executed corresponding to each operation content; and the management computer determines whether the designated operation can be executed or not based on the logical partition correlation information.

8. The management computer according to claim 7, wherein
the first storage subsystem and the second storage subsystem have respective multiple interfaces for connecting with the host computer, at least one of the interfaces of the first storage subsystem and at least one of the interfaces of the second storage subsystem are mutually connected via a transmission line; and upon creating the logical partition correlation information defined with respect to a pair of a partition belonging to the first storage subsystem and a partition belonging to the second storage subsystem, the management computer includes in the logical partition correlation information an information specifying that the operation executed using only resources within a single storage subsystem cannot be performed.

9. The management computer according to claim 7, wherein
the first storage subsystem and a third storage subsystem out of the multiple storage subsystems are connected via a second transmission line capable of transmitting data at a higher speed than the transmission line connecting the interfaces for connecting to the host computer, wherein the second transmission line mutually connects respective components within the first storage subsystem and respective components within the third storage subsystem; and upon creating the logical partition correlation information defined with respect to a pair of a partition belonging to the first storage subsystem and a partition belonging to the third storage subsystem, the management computer includes information showing that the operation executed using only resources within a single storage subsystem can be performed.

10. The management computer according to claim 7, wherein
at least one of the multiple resources is a volume that the storage subsystem has, and the resource operation content is a replication instruction of the volume belonging to one of the virtual storage subsystems;

when the management computer receives a replication instruction defining two volumes belonging to one of the virtual storage subsystems as a copy source volume and a copy destination volume, the management computer determines whether the logical partition correlation information defined with respect to the pair belonging to different partitions indicates that execution of the replication is possible or not when the two volumes belong to different partitions;

as a result of the determination, if the logical partition correlation information indicates that the execution of the replication is not possible, the computer notifies an operator that the replication instruction is rejected; and as a result of the determination, if the logical partition correlation information indicates that the execution of the replication is possible, the computer specifies a storage subsystem having the volume, and transmits a replication instruction to the specified storage subsystem.

* * * * *